US012730277B2

(12) United States Patent
Johnston et al.

(10) Patent No.: US 12,730,277 B2
(45) Date of Patent: Sep. 8, 2026

(54) STRANDED OPTICAL FIBER CABLE

(71) Applicant: CORNING RESEARCH & DEVELOPMENT CORPORATION, Corning, NY (US)

(72) Inventors: Peter J. Johnston, Taylorsville, NC (US); Xiang-Dong Mi, Corning, NY (US); Christopher Mark Quinn, Hickory, NC (US); Michael Sauer, Corning, NY (US); David Alan Seddon, Advance, NC (US)

(73) Assignee: CORNING RESEARCH & DEVELOPMENT CORPORATION, Corning, NY (US)

(*) Notice: Subject to any disclaimer, the term of this patent is extended or adjusted under 35 U.S.C. 154(b) by 0 days.

(21) Appl. No.: 19/423,418

(22) Filed: Dec. 17, 2025

(65) Prior Publication Data

US 2026/0177770 A1 Jun. 25, 2026

Related U.S. Application Data

(63) Continuation-in-part of application No. 19/272,729, filed on Jul. 17, 2025, now Pat. No. 12,529,858.

(60) Provisional application No. 63/836,682, filed on Jul. 1, 2025, provisional application No. 63/673,367, filed on Jul. 19, 2024.

(51) Int. Cl.
*G02B 6/44* (2006.01)

(52) U.S. Cl.
CPC .......... *G02B 6/4434* (2013.01); *G02B 6/443* (2013.01)

(58) Field of Classification Search
CPC ........................................ G02B 6/44
USPC ........................................ 385/100
See application file for complete search history.

(56) References Cited

U.S. PATENT DOCUMENTS

| | | | | |
|---|---|---|---|---|
| 6,895,155 | B2 * | 5/2005 | Gasca | G02B 6/02314 385/12 |
| 9,658,393 | B2 * | 5/2017 | Digiovanni | G02B 6/032 |
| 11,156,768 | B2 | 10/2021 | Digiovanni et al. | |

(Continued)

FOREIGN PATENT DOCUMENTS

| | | | | |
|---|---|---|---|---|
| WO | WO-2020070488 A1 * | 4/2020 | | G01M 11/33 |
| WO | 2023/234355 A1 | 12/2023 | | |

(Continued)

OTHER PUBLICATIONS

International Search Report and Written Opinion of the International Searching Authority; PCT/US2025/037299; mailed on Nov. 4, 2025; 9 pages; Commissioner for Patents.

(Continued)

*Primary Examiner* — Kaveh C Kianni
(74) *Attorney, Agent, or Firm* — Russell S. Magaziner

(57) ABSTRACT

An optical fiber cable comprises a plurality of buffer tubes, a hollow-core optical fiber disposed within one of the plurality of buffer tubes, and a central strength member. The plurality of buffer tubes are helically stranded about the central strength member, where a diameter d of the central strength member and a lay length l of the plurality of buffer tubes around the central strength member satisfy the following inequality: $d \leq 0.075l - 6.875$. A cable jacket surrounds the plurality of buffer tubes, where a radius of curvature of the hollow-core optical fiber, when the optical fiber cable is kept straight at a temperature of 20° C., is 200 mm or greater.

10 Claims, 11 Drawing Sheets

(56) References Cited

U.S. PATENT DOCUMENTS

| | | | | |
|---|---|---|---|---|
| 11,747,552 | B1 * | 9/2023 | Cataletto | G02B 6/3807 385/125 |
| 11,835,755 | B2 | 12/2023 | Harker et al. | |
| 2002/0136511 | A1 | 9/2002 | Cecchi et al. | |
| 2003/0174977 | A1 * | 9/2003 | Mayer | G02B 6/4411 385/100 |
| 2005/0103518 | A1 * | 5/2005 | Glew | G02B 6/4489 174/113 C |
| 2007/0047885 | A1 * | 3/2007 | Mayer | G02B 6/4403 385/100 |
| 2007/0237460 | A1 * | 10/2007 | Fan | G01N 21/7746 385/12 |
| 2009/0059966 | A1 * | 3/2009 | Mayer | G02B 6/4403 385/105 |
| 2021/0396927 | A1 * | 12/2021 | Harker | H04B 10/073 |
| 2022/0187532 | A1 | 6/2022 | Unnimadhava Kurup Soudamini Amma et al. | |
| 2023/0014659 | A1 | 1/2023 | Corrado et al. | |
| 2024/0036252 | A1 * | 2/2024 | Dainese, Jr. | G02B 6/032 |
| 2024/0176088 | A1 | 5/2024 | Blazer et al. | |

FOREIGN PATENT DOCUMENTS

| | | | |
|---|---|---|---|
| WO | 2024/015049 | A1 | 1/2024 |
| WO | 2024/035511 | A1 | 2/2024 |

OTHER PUBLICATIONS

Invitation to Pay Additional Fees of the International Searching Authority; PCT/US2025/037299; dated Sep. 2, 2025; 2 pages; Commissioner for Patents.

* cited by examiner

800

STRANDED OPTICAL FIBER CABLE

PRIORITY

This Application is a Continuation-in-Part of U.S. application Ser. No. 19/272,729 filed Jul. 17, 2025, which claims priority benefit of U.S. App. Nos. 63/836,682 filed Jul. 1, 2025 and 63/673,367 filed Jul. 19, 2024; and this Application also claims priority benefit of U.S. App. No. 63/836,682 filed Jul. 1, 2025, each of which is hereby incorporated by reference herein in its entirety.

This Application also incorporates by reference in their entireties each of U.S. App. Nos. 63/846,498 filed Jul. 18, 2025 and Ser. No. 19/273,996 filed Jul. 18, 2025 as well as International App. No. PCT/US2025/037299 filed Jul. 11, 2025.

BACKGROUND

The present disclosure relates to optical fiber cable, and more specifically to stranded loose-tube or tight-buffer cable supporting specialized optical fibers, such as optical fibers designed to communicate optical signals through a hollow core.

Optical fiber cables may include one or more optical fibers disposed within a cable jacket. The optical fiber may include a core, a cladding, and a coating surrounding the cladding to protect the optical fiber. The core may be solid glass through which an optical signal may propagate. However, specialized optical fibers have been developed, such as those formed with a hollow core or free space in air or a vacuum along which an optical signal may propagate. Due to propagation of an optical signal in air or vacuum rather than a solid glass core, latency of an optical signal may less. Different hollow-core and other specialized optical fibers have varying designs. Some such specialized or new optical fibers may break or attenuate when packaged in a cable or otherwise handled.

A need exists for new cables and methods of making and handling the same that support such optical fibers.

SUMMARY OF THE DISCLOSURE

The following is a brief summary of subject matter that is described in greater detail herein. This summary is not intended to be limiting as to the scope of the claims.

According to an Aspect of the present disclosure, an optical fiber cable comprises a first primary-capillary comprising glass and surrounding an interior passage thereof and a first nested-capillary positioned within the interior passage of the first primary-capillary. The first nested-capillary has an open space extending lengthwise therein and only fills a portion of the interior passage of the first primary-capillary. The cable further comprises a cladding having a round cross-section and surrounding the first primary-capillary and in turn the first nested-capillary. The first primary-capillary is fixed to an interior surface of the cladding. The cable still further comprises two other primary-capillaries in addition to the first primary-capillary, the two other primary-capillaries also fixed to the interior surface of the cladding. Portions of exteriors of each of the first primary-capillary and the two other primary-capillaries line a hollow core therebetween, where the hollow core is configured to convey an optical signal communicated lengthwise therealong. Accordingly, the cladding, the first primary-capillary, the first nested-capillary, and the two other primary-capillaries each form part of a first optical fiber. The cable comprises a coating layer surrounding the first cladding of the first optical fiber, where the coating layer comprises an ultra-violet-light curable and/or thermoset polymer. The cable comprises a first buffer tube comprising thermoplastic and having a cross-sectional dimension orthogonal to a length thereof measured from an exterior thereof through a geometric center thereof and to an opposing exterior thereof that is at least twice that of the coating layer of the first optical fiber. The first buffer tube surrounds the first optical fiber. The cable comprises two other buffer tubes in addition to the first buffer tube, where the two other buffer tubes each surround at least one other optical fiber; a strength member comprising fiber-reinforced plastic; and a cable jacket surrounding the strength member, the first buffer tube, and the two other buffer tubes. Each of the first buffer tube and the two other buffer tubes are stranded around the strength member within the cable jacket such that the first optical fiber has a longer length than the optical fiber cable. The first optical fiber is loosely positioned in the first buffer tube and/or the first buffer tube is loosely positioned within the cable jacket such that the first optical fiber is at least partially free to move relative to the first buffer tube and/or relative to the strength member, to a lower stress position, as the cable bends in an arc of 500 mm, twists 3° per 2 m length, and/or stretches by 0.3% strain.

The above summary presents a simplified summary in order to provide a basic understanding of some aspects of the systems and/or methods discussed herein. This summary is not an extensive overview of the systems and/or methods discussed herein. It is not intended to identify key or critical elements or to delineate the scope of such systems and/or methods. Its sole purpose is to present some concepts in a simplified form as a prelude to the more detailed description that is presented later.

BRIEF DESCRIPTION OF THE DRAWINGS

The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
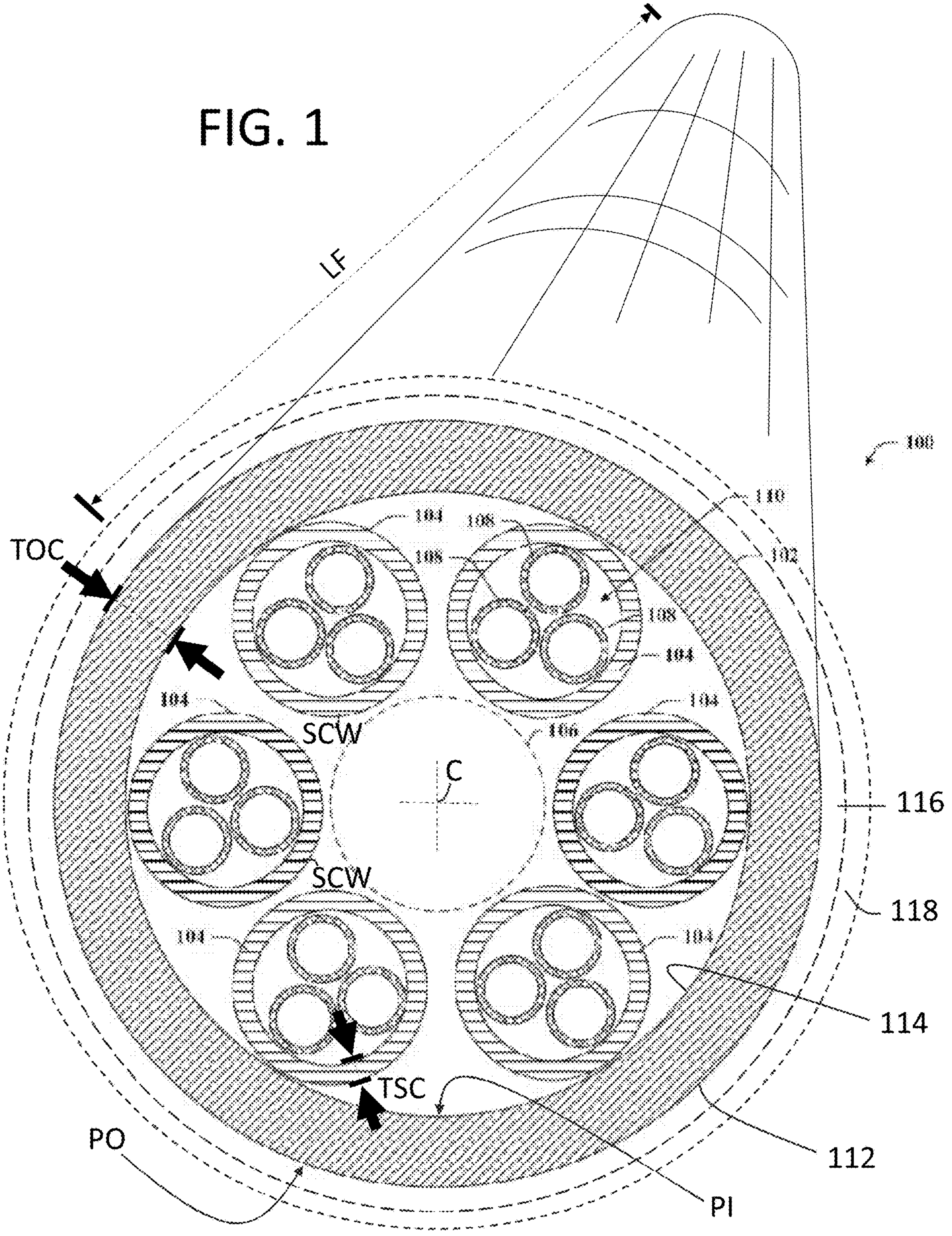
FIG. 1 is a cross-sectional view of an optical fiber according to an aspect of the present disclosure.

Various technologies pertaining to an optical fiber cable are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. Further, it is to be understood that functionality that is described as being carried out by certain system components may be performed by multiple components. Similarly, for instance, a component may be configured to perform functionality that is described as being carried out by multiple components.

Referring now to FIG. 1, a cross-sectional view of an optical fiber 100 is illustrated. According to an aspect, the optical fiber 100 comprises a cladding 102 (e.g., cladding, tunnel, channel, passageway, pipe). According to an aspect, the cladding 102 of the optical fiber 100 has an outer surface 112 and an inner surface 114.

The outer and inner surfaces 112, 114 of the cladding 102 may be spaced apart from one another by a thickness TOC of material (e.g., glass) of the cladding 102. According to an aspect, the thickness TOC may be less than 300 μm, such as less than 200 μm, less than 150 μm, less than 100 μm, possibly less than 50 μm, and/or greater than 3 μm, such as greater than 5 μm, such as greater than 10 μm, possibly greater than 15 μm, for example.

According to an aspect the thickness TOC may vary around the cladding 102, when viewed in cross-section, such as where at least one portion of the cladding 102 is thicker than another portion. For example, the thicker portion may be thicker than another portion of the cladding 102 by at least 5% relative thereto, such as at least 10%, at least 20%, and/or less than 200%. Variation in thickness TOC may be due to coupling of interior components of the optical fiber 100 to the cladding 102, such as capillaries 104. That said, in some designs, the cladding 102 of the optical fiber 100 may have a generally constant thickness TOC around a perimeter of the cladding 102, such as within ±20% of a certain thickness (e.g., ±15%, ±10%, ±5%), such as a mean or median thickness TOC, such as where the cladding 102 is largely independent of interior components of the optical fiber 100. Maintaining a generally constant thickness TOC of the cladding 102 of the optical fiber 100 may help control bending of the optical fiber 100 by mitigating bend preference.

According to an aspect, the cladding 102 is round in cross-section, such as circular or oval. Where outer roundness is 4π×(area within perimeter $P_O$ defined by the outer surface in cross-section)/(perimeter $P_O$ distance)$^2$, the outer roundness of the cladding 102 of the optical fiber 100 may be less than 1 at least is some parts thereof, but close thereto, such as greater than 0.95, such as greater than 0.99. According to an aspect, the optical fiber 100 has a cross-sectional dimension DOF (see FIG. 2) orthogonal to length (e.g., widest cross-sectional dimension, diameter, major axis dimension) that is less than 500 μm, such as less than 300 μm, and/or at least 50 μm, such as at least 100 μm. Smaller cross-sections may facilitate greater flexibility of the optical fiber 100 and/or a corresponding cable. This cross-sectional dimension may correspond with the diameter of a cladding 102 that may be round, and/or with coating(s) 116, 118 overlaying such a cladding 102.

Similarly, where inner roundness is 4π×(area within perimeter $P_I$ defined by the inner surface 114 in cross-section)/(perimeter $P_I$ distance)$^2$, the inner roundness of the cladding 102 of the optical fiber 100 may be less than 1, but close thereto, such as greater than 0.95, such as greater than 0.99. It is contemplated the outer or inner surfaces 112, 114 of the cladding 102 may be round (i.e. 1.00 and/or 1.00±0.4) in certain cross-sections and less than round (e.g., 0.99) in other cross-sections along a length LF of the optical fiber 100.

According to an aspect, the outer perimeter PO of the cladding 102 is rounder than the inner perimeter PI, such as by at least 0.01, such as by at least 0.04, such as by at least 0.1, and/or no more than 0.8. Maintaining a generally round shape of the cladding 102 of the optical fiber 100 help control bending of the optical fiber 100 by mitigating bend preference. Non-round geometry of the inner perimeter PI may facilitate coupling of interior elements within the optical fiber 100. That said, Applicants contemplate that the inner perimeter PI may be as round or rounder than the outer perimeter PO, and both may have a roundness greater than 0.99, such as 1.00 and/or 1.00±0.4.

According to an aspect, the cladding 102 provides protection and/or rigidity to the optical fiber 100. The cladding 102 continuously extends for a long, uninterrupted distance along the length LF of the optical fiber 100, without splicing, whereby structural weaknesses and optical variations are mitigated. According to an aspect, the length LF is at least one meter, such as at least ten meters, such as at least thirty meters, and/or less than one hundred kilometers. The length LF may be measured by separating the optical fiber 100 from a cable and measuring the length LF thereof because, as further explained below, the length LF may not match that of the respective cable due to excess fiber length.

According to an aspect, the cladding 102 may comprise (e.g., consist more than 50% by volume of, >80 vol %, >90 vol %, such as 100%) glass, such as a silicate glass. According to an aspect, glass of the cladding 102 may have at least 30 mol % silica ($SiO_2$) and/or less than 99.9% silica (i.e. is a silicate glass other than not fused silica). The glass may further comprise alumina ($Al_2O_3$), such as at least 2 mol % and less than 40 mol %, where the silica and alumina help build a molecular network for the glass. The glass may further include boria ($B_2O_3$), such as at least 2 mol % and less than 40 mol %, which may help lower a liquidus temperature of the glass. The glass may further include titania ($TiO_2$), such as at least 2 mol % and less than 40 mol % for strength and/or optical properties. While oxides provided herein are, by convention, representative of constituents and their respective molar percentages in the glass, the constituents may well be provided to a respective batch melt by more complex compounds as raw materials, such as borax for example. The cladding 102 may comprise or consist of a silica-based glass (e.g., >50 mol % silica). Moreover, capillaries 104 may too comprise or consist of a silica-based glass, such as glass of the same composition. Put another way, each of the capillaries 104 may comprise the same or similar material as the cladding 102.

According to an aspect, the glass of the cladding 102 and/or capillaries 104 may be mostly or fully amorphous, for example having less than 0.1 vol % crystallinity or other inclusions, such as less than 0.05 vol %, such as a non-zero and detectable-amount of crystals or other inclusions; and/or a non-zero and detectable-amount amount but less than 1 vol %. Amorphous glass may have flatter surfaces than glassceramic for example, which may help with signal propagation through the optical fiber 100 such as by reducing scatter.

According to aspect, the glass of the cladding 102 may have a coefficient of thermal expansion greater than that of fused silica over a temperature range of 100-300° C., whereby the glass may expand (at least to some degree) as the cable heats, such as greater than 0.25 ppm/K on average over 100-300° C., such as greater than 0.5 ppm/K over that temperature range, such as greater than 1 ppm/K, such as greater than 2 ppm/K, and/or less than 25 ppm/K, mitigating heat-induced expansion mismatch with other elements of the cable.

While the optical fiber 100 transmits light, such as for communication of information carried thereby, glass of the optical fiber 100 may not be particularly translucent. According to an aspect, glass of the cladding 102 may be such that the glass transmits (total transmission) less than 99% of light in a range of 400 to 700 nm directed along 1 mm path length through the glass, such as less than 98%, such as less than 95%. Accordingly, glass of the cladding 102 may appear colored (e.g., dark gray, blue, green). Deeper fiber color may help a handler better see the optical fiber 100, such as during connectorization (i.e. process of building the respective optical fiber into an optical connector) for example.

According to an aspect, within the cladding 102, the optical fiber 100 includes capillaries 104 (e.g., primary-capillaries having nested-capillaries therein; capillary tubes, sub-conduits). The capillaries 104 may be round in cross-section as shown in FIG. 1, or the capillaries 104 may be otherwise shaped (e.g., arch-shaped, oval, minor sector shaped i.e. pie-slice shaped). As discussed above, the capillaries 104 may be directly or indirectly coupled to and/or partially formed from the inner surface 114 of the cladding 102, such as in a case where a capillary in cross-section includes an arch with each leg thereof anchored on the inner surface 114 of the cladding 102. The capillaries 104 may be positioned around the inner perimeter PI of the cladding 102. According to an aspect, the capillaries 104 are equally spaced apart from one another along the inner perimeter PI. As shown in FIG. 1, the optical fiber 100 may have more than one of the capillaries 104, such as at least three or more (e.g., four, five, six).

According to an aspect, the capillaries 104 may comprise glass (e.g., consisting more than 50% by volume of, >80 vol %, >90 vol %, such as 100%) glass, such as a silicate glass of a composition as described above with respect to the cladding 102. Each of the capillaries 104 may comprise (e.g., consist more than 50% by volume of, >80 vol %, >90 vol %, such as 100%) or consist of a silica-based glass (e.g., silica doped with fluorine, germanium). According to an aspect, the glass may be mostly or fully amorphous as discussed above. Amorphous glass may have a flatter surfaces, which may directly or indirectly help with signal propagation through the optical fiber 100 such as by mitigating scatter-based attenuation.

According to an aspect, glass of the cladding 102 and glass of the capillaries 104 may be formed together by a drawing process to form the optical fiber 100, with the capillaries 104 attached to and/or partially forming the inner surface 114 of the cladding 102. As indicated above, glass of the capillaries 104 may have the same composition and/or coefficient of thermal expansion and/or modulus of elasticity as the glass of the cladding 102, which may help the optical fiber 100 to maintain relative dimensions and shape during drawing and cooling of the optical fiber 100.

According to an aspect, the capillary 104 includes a wall SCW (or walls) thereof. The wall SCW of the capillary 104 may have a thickness TSC that is thinner than thickness TOC of the cladding 102, such as where the thickness TSC of at least a portion of the wall SCW is less than half the thickness TOC, such as less than a third, less than a fourth, or may even be less than a fifth the thickness TOC. As such, relative thickness of the cladding 102 compared to capillary 104 and location of the cladding 102, further from a center C (e.g., geometric centroid of cross-section perpendicular to length) of the optical fiber 100 may be such that the cladding 102 largely controls bending performance of the optical fiber 100.

The capillaries 104 are each depicted in FIG. 1 in the optical fiber 100 as having a plurality of nested-capillaries 108 (e.g., tubes, straws, rods, micro-pipes), where at least one of the nested-capillaries 108 is disposed nested within an interior cavity 110 of a respective capillary 104. Put another way, according to an aspect, the wall SCW of the capillary 104 may surround a space in which is the nested-capillary 108. As shown in FIG. 1, the capillary 104 may contain more than one such nested-capillary 108, such as two, three, four, etc. According to an aspect, the nested-capillary 108 may comprise or consist of a silica-based glass, which may be the same as that of the cladding 102 and/or the wall SCW.

The optical fiber 100 depicted in FIG. 1 is shown as having six of the capillaries 104, and it is to be appreciated that an optical fiber can have various numbers of capillaries 104 (e.g., ≥2, ≥3, ≥4, ≥6, or ≥8 sub-conduits, and/or ≤50, ≤20, ≤10). Furthermore, the optical fiber 100 depicted in FIG. 1 is shown as having nested-capillaries 108 in each of the capillaries 104, and it is to be appreciated that an optical fiber can have various numbers of nested-capillaries disposed within a single capillary as shown (e.g., ≥1, ≥2, ≥3, ≥4, or ≥5 straws, and/or ≤50, ≤20, ≤10). It is further to be appreciated that where the optical fiber 100 has a plurality of the nested-capillaries 108 within a single capillary 104, nested-capillaries 108 within a same capillary 104 may be different sizes from one another. Likewise the capillaries may vary in size, such as where one such capillary 104 may be coupled to the cladding 102 and have a size comparable to the nested-capillary 108, for example, but distinguished therefrom by not being within a capillary 104 for example.

As shown with dashed lines in FIG. 1, the optical fiber 100 may include one or more coating layers 116, 118 on the outer surface 112 of the cladding 102. These coating layers 116, 118 may be primary- (116) and secondary-coating layers (118). According to an aspect, the coatings layers 116, 118 may be or include, for example, a polymer, such as a thermoset, an ultra-violet-light curable polymer (e.g., acrylate, polyimide, silicone) and may be configured such that the secondary coating layer 118 is harder than the primary coating layer 116. In further embodiments, one or more of the coating layers 116, 118 may be or include a coded or unique colorant, or an additional ink or coating layer, to help facilitate identification of the corresponding optical fiber 100 from among a group of such optical fibers.

Still referring to FIG. 1, according to an aspect, portions of walls SCW of the cladding 102 face one another across the center C of the optical fiber 100 (or other portion of an optical fiber) and also border a hollow core 106 (e.g., passage, hollow passageway) extending through the optical fiber 100. Put another way, in the center C of the optical fiber 100, when viewed in cross-section as shown in FIG. 1, the optical fiber 100 includes the hollow core 106 between the capillaries 104 and nested-capillaries 108, where the capillaries 104 at least partially border and thereby define the hollow core 106.

The hollow core 106 may be used for optical communications, such as where signals conveyed in light pass longitudinally through the hollow core 106 and along the optical fiber 100. Furthermore, the capillaries 104 and nested-capillaries 108 therein may serve as features of the optical fiber 100 that mitigate resonance of light conveyed through the hollow core 106. While the optical fiber 100 includes the cladding 102, capillaries 104, nested-capillaries 108, and hollow core 106, other specialized optical fibers or fiber designs may benefit from teachings of the present disclosure. For example, Applicants contemplate that the hollow core 106 may be offset from the center C of an optical fiber, or an optical fiber may have two or more such hollow cores 106.

Figure 2:
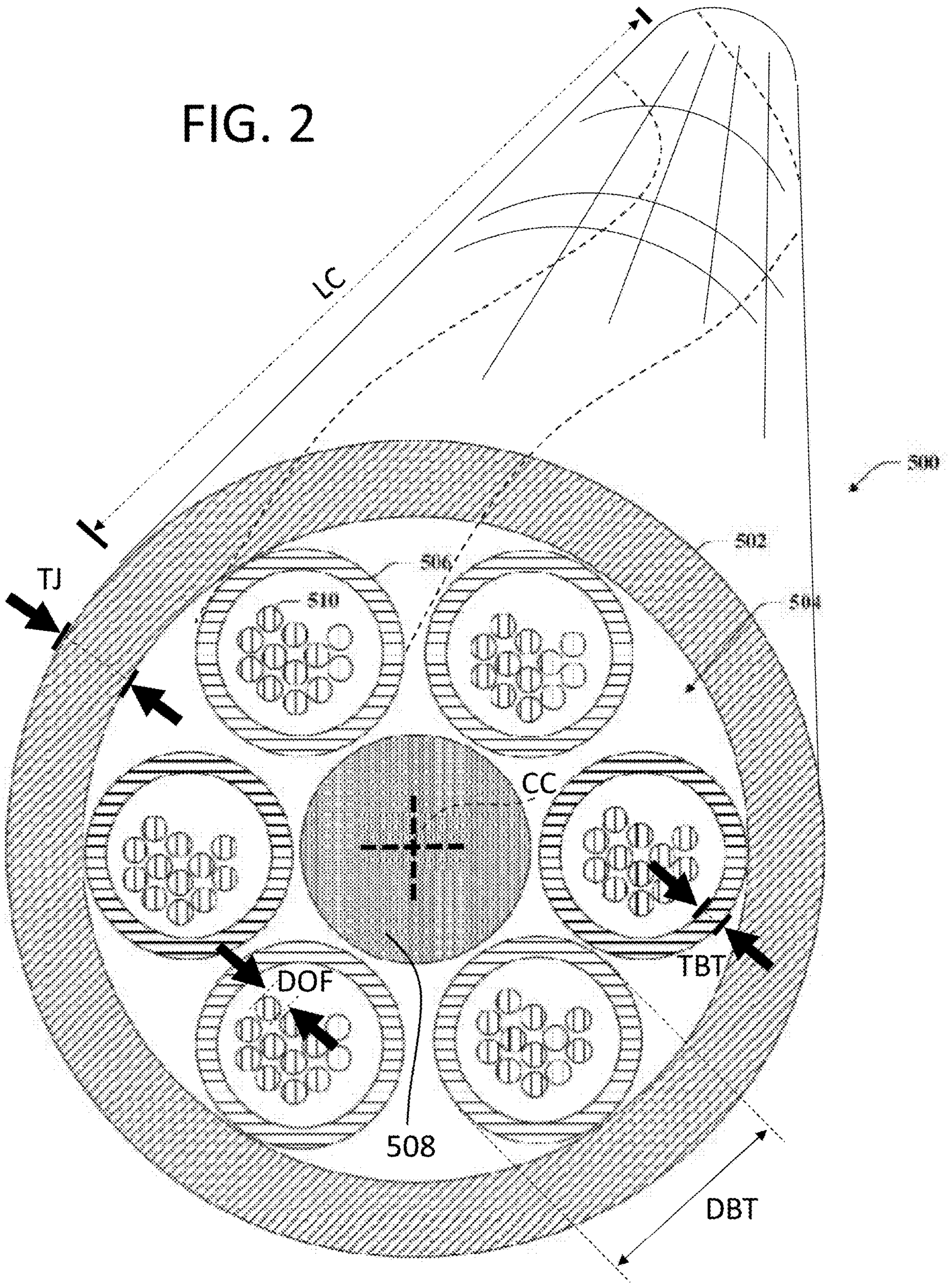
FIG. 2 is a cross-sectional view of an optical fiber cable according to an aspect of the present disclosure.

Referring now to FIG. 2, an optical fiber cable 500 is illustrated in cross-section. The cable 500 includes a cable jacket 502, which surrounds a communication element of the cable 500, such as an optical fiber 510, which may correspond to the optical fiber 100 of FIG. 1. The cable 500 is of a configuration that may be particularly useful for hollow-core optical fibers, when parts of the cable 500 are arranged as disclosed herein. Perhaps surprising, the structure of the cable 500, with buffer tubes 506 and optical fibers 510 surrounded by the cable jacket 502, parallels structure of the optical fibers 510, such as optical fiber 100 having the cladding 102, capillaries 104, and nested-capillaries 108.

Applicants find the nested structure of the cable 500, when viewed in cross-section, with round cable jacket 502 to round buffer tubes 506, to round optical fibers 510 (e.g., optical fiber 100), to cladding 102 that may be round, to round capillaries 104, to round nested-capillaries 108, to facilitate bending flexibility because the corresponding elements are largely free of bend preference, and also to facilitate strength of the cable 500 traverse to length because rounded arcs bear loading. That said, dimensions of parts and relationships therebetween of the cable 500 shown in FIG. 2 may not be to scale in FIG. 2 (or in other figures herein). For example, a ratio of jacket thickness TJ to widest cross-sectional dimension (e.g., diameter) DOF of the optical fiber 510 (i.e. TJ/DOF) may be greater than that ratio with dimensions shown in FIG. 2.

According to an aspect of the present disclosure, for example, optical fibers 510 of the cable 500 may be positioned relatively closer to a center CC of the cable 500 than shown, such as when the cable is stretched longitudinally (e.g., at 50° C., with polymer of the cable jacket 502 in an expanded state; or when the cable is tensioned under its own weight between telephone poles). As such, available space for movement of the optical fibers 510 compensates for glass of the optical fiber(s) having greater modulus of elasticity (e.g., much greater; ≥×50, ≥×100 on average over elastic range of the glass; e.g., 70 GPa for the glass versus 0.1 GPa for the polymer) and lower coefficient of thermal expansion (e.g., much lower; ≤×(1/5), ≤×(1/10) on average over the temperature range of 0-300° C.; e.g., 9E-6/° C. for the glass versus 160E-6/° C. for polymer) than polymer of the cable jacket 502 or other parts of the cable 500.

According to an aspect of the present disclosure, as shown in FIG. 2, the cable jacket 502 may surround and accordingly define an interior cavity 504 of the cable 500. The cable jacket 502 may have a substantially circular outside profile in cross-section, and the cable 500 may have little to no bend preference, which may ease placement of the cable 500 during installation of the cable 500 around curves. Accordingly, as shown in FIG. 2, the interior cavity 504 of the cable 500 may have a substantially circular cross-section. That said, Applicants contemplate other cable geometries, such as ellipsoid in cross-section, obround in cross-section. For cables with a thin cable jacket 502, the shape of the cable jacket 502 in cross-section may also largely be a function of adjoining interior components of the cable 500, such as having bulges corresponding to underlying buffer tubes 506.

According to an aspect, the cable jacket 502 comprises a polymer that may be resistant to abrasion and corrosion, as well as water resistant. The cable jacket 502 may comprise polyethylene or polyvinyl chloride for example. In some instances, the cable jacket 502 may be made with flame retardant materials, or low-smoke-zero-halogen materials. According to an aspect, the cable jacket 502 is extruded over parts therein, including the communication element. Thickness TJ of the cable jacket 502 may be greater than 0.5 mm, such as greater than 1 mm, and/or less than 2 cm, such as less than 1 cm, such as less than 5 mm.

Jacket thickness JT and material thereof influence bending performance of the cable 500, and also help to prevent buckling and/or over-bending of the optical fiber 510, which may attenuate signals communicated thereby. The cable jacket 502 and associated thickness JT may protect the optical fibers 510. According to an aspect, for a polymer-based cable jacket 502, such as comprising (e.g., consisting more than 50% by volume of, >80 vol %, >90 vol %, such as 100%) polyethylene or polyvinyl chloride, thickness JT of the cable jacket 502 is at least 5 times the widest cross-sectional dimension DOF (i.e. orthogonal to a length thereof; e.g., diameter) of an optical fiber 510 therein, such as at least 10 times, at least 15 times, and/or less than 500 times, such as less than 200 times. If coated, such as with primary and/or secondary coatings, as disclosed herein, and/or if colored with an ink, as disclosed herein, DOF would include such features. But, DOF would not include dimensions of a buffer tube overlaying the optical fiber, such as a tight-buffer overlaying a coating layer of an optical fiber. According to an aspect, for a polymer-based cable jacket 502, such as comprising (e.g., consisting more than 50% by volume of, >80 vol %, >90 vol %, such as 100%) polyethylene or polyvinyl chloride and for optical fiber 510 having features of the optical fiber 100 of FIG. 1, the jacket thickness JT is at least 50 times thicker than the thickness TOC of the cable jacket 502 (see FIG. 1), such as at least 100 times, such as at least 200 times, and/or not more than 20,000 times thicker.

Still referring to FIG. 2, the cable 500 comprises a buffer tube 506 (e.g., buffer, container, sheathing), such as more than one buffer tube 506, and a strength member 508, such as a central strength member, located in the center CC of the cable 500. The buffer tube 506 and strength member 508 are disposed within the interior cavity 504 of the cable jacket 502. The strength member 508 differentiates the analogy between the cable 500 and optical fiber 100 structures, where the strength member 508 is not a hollow core 106. The strength member 508 may comprise a bundle of aramid fibers, fiber- (e.g., glass fiber)-reinforced plastic, steel cable, or other material that may be designed to support axial loading, such as in tension and/or in compression. In other contemplated embodiments, the strength member 508 or multiple such strength members may be embedded in the cable jacket 502.

According to an aspect, the buffer tube 506 comprises a polymer that may be resistant to abrasion and corrosion, as well as water resistant. The buffer tube 506 may comprise a polypropylene, polyvinylchloride, polybutylene terephthalate, polyethylene, or another polymer; or for alternative tight-buffer designs with the buffer tube 506 snuggly holding a single optical fiber 510, material thereof may comprise a polymer such as a fluoropolymer, such as polyvinylidene fluoride, polytetrafluoroethylene, or polyurethane for example, or may comprise another polymer. As with the cable jacket 502, in some instances, the buffer tube 506 may be made with flame retardant materials, or low-smoke-zero-halogen materials. The buffer tube 506 may have a two-layer construction where a first layer (e.g., interior layer, exterior) comprises polycarbonate and a second layer comprises polybutylene terephthalate (PBT) or other combinations of materials. Such two-layer constructions may provide additional mechanical protection for optical fibers 510 beyond that provided by single-layer of buffer tubes 506 of materials above.

According to an aspect, a widest cross-sectional dimension DBT (e.g., diameter unflattened) of the buffer tube 506 is at least 0.5 mm (e.g., for tight buffer), such as at least 2 mm (e.g., for loose tube), and/or no more than 1 cm, such as less than 7 mm, such as less than 5 mm. According to an aspect, the buffer tube 506 is extruded over parts therein, such as the optical fiber 510 (or optical fibers, such as 1, 3, 6, 9, or 12 optical fibers) and a means for blocking water, such as water-swellable powder (e.g., grains of superabsorbent polymers, such as cross-linked polyacrylates and/or polyacrylamides), water-swellable yarn, and/or gel or grease, for example; or for tight buffers, just the optical fiber 510. Gel or grease may impart less stress on the optical fiber 510 than powder for example, however powder and yarn may be less messy to handle when accessing the optical fiber 510. That said, some optical fiber 510 may be fully functional in "dry" buffer tubes, such as those with super absorbent polymer particles (both the standard type and the Kalahari round type), where the polymer in powder form may be at least partially bonded to interior walls of the respective buffer tubes 506. Optical fibers 510 in a buffer tube 506 may differ from one another by color and/or marking (e.g., repeating symbols, patterned colors), and/or structure (e.g., solid-core fibers, multi-core fibers, hollow-core fibers, single-mode, and/or multi-mode). Similarly, the buffer tubes 506 themselves may differ from one another by color and/or marking and/or structure (e.g., diameter, wall thickness, cross-sectional geometry).

The buffer tube 506 helps protect and isolate the optical fiber 510 from forces applied to the cable 500 and from interaction with other elements within the cable 500, such as the strength member 508 for example. For example, the cable 500 may stretch or compress, and the optical fibers 510 may move to low stress positions within the respective buffer tubes 506. However, thickness TBT and material of the buffer tube 506 influences bending characteristics thereof, and the buffer tube 506 may further benefit from flexing and shifting within the cable jacket 502, as the cable 500 is bent or otherwise deformed to allow movement of the optical fibers 510 to low-stress positions. According to an aspect, wall thickness TBT of the buffer tube 506 is greater than 40 μm, such as greater than 80 μm, and/or less than 500 μm. Other thicknesses TBT are contemplated, such as less than 40 μm for a thin-walled buffer tube, or greater than 500 μm, such as for thick tight buffer.

According to an aspect, for a polymer-based cable jacket 502, such as comprising polyethylene or polyvinyl chloride and for buffer tube 506 containing the optical fiber 100 of FIG. 1, the cable jacket thickness JT is at least 10 times thicker than the thickness TBT of the wall of the buffer tube 506, such as at least 20 times, and/or not more than 500 times thicker. According to an aspect, for a polymer-based buffer tube 506, such as comprising polypropylene, polyvinylchloride, polybutylene terephthalate, or polyethylene and for the optical fiber 510 having features of the optical fiber 100 of FIG. 1, the wall thickness TBT of the buffer tube 506 is at least 5 times thicker than the thickness TOC of the cladding 102 (see FIG. 1), such as at least 10 times, such as at least 20 times, and/or not more than 2000 times thicker, such as not more than 1000 times thicker.

Referring to FIG. 2 again, the cable 500 further comprises the optical fiber 510, positioned within the buffer tube 506, positioned within the cable jacket 502. According to an aspect, the buffer tube 506 is a loose tube buffer, and holds a plurality of optical fibers 510. The optical fibers 510 contact other optical fibers in the buffer tube 506, and have space to move relative to one another in the buffer tube 506. The space and freedom may allow the optical fibers 510 to position themselves in low-stress orientations within the buffer tube 506, within the cable 500, where some or each of the optical fibers 510 may be so-called hollow-core fibers and have attributes described herein (e.g., fragile nature, sensitivity to attenuation) such as with respect to optical fiber 100. The buffer tubes 506 of the cable 500 in FIG. 2 each hold twelve optical fibers 510, where each of the twelve may be uniquely colored or otherwise marked for differentiation and identification.

Figure 3:
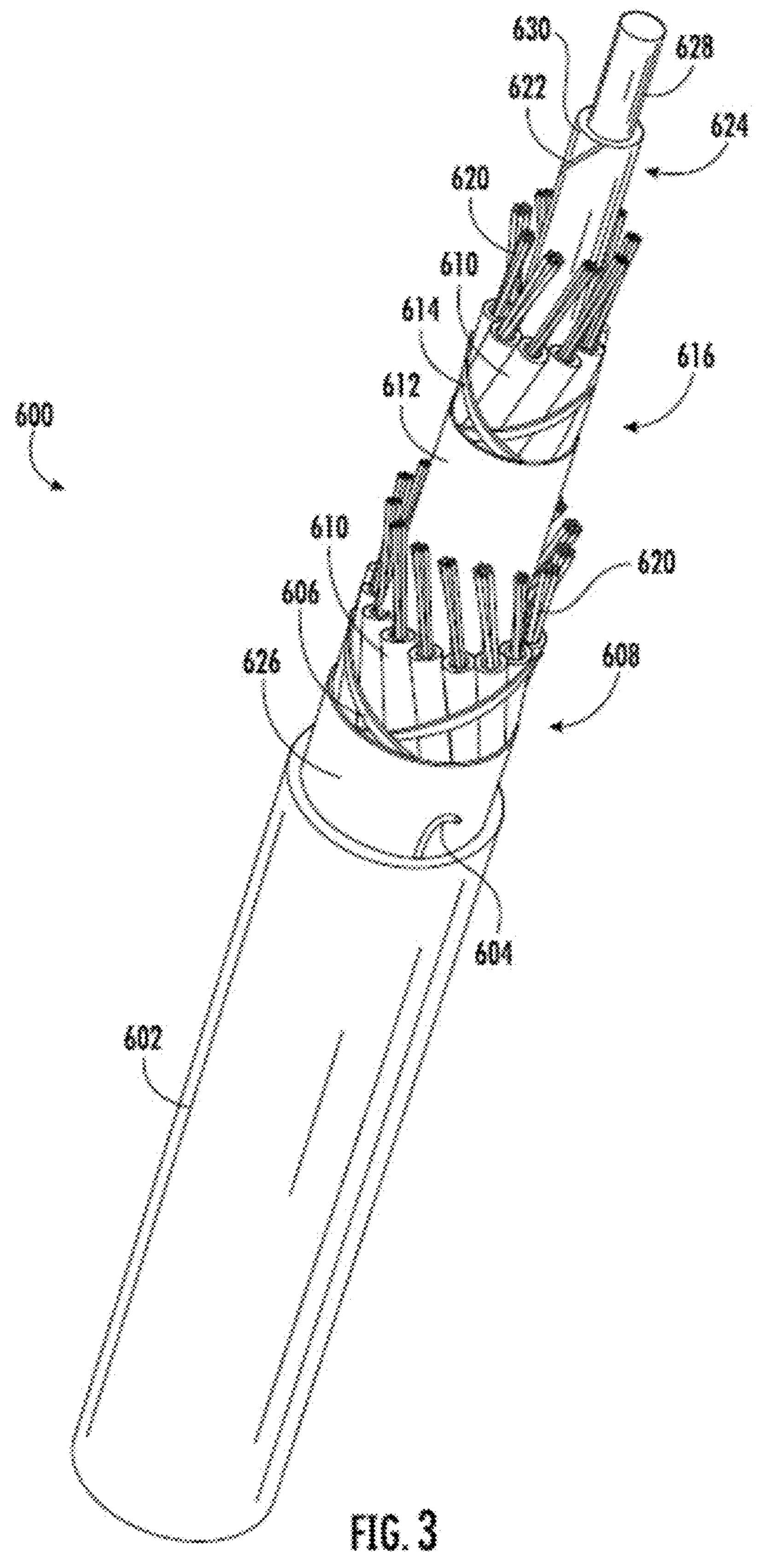
FIG. 3 is a perspective cross-sectional view of another optical fiber cable, not necessarily to scale, but generally representative of a loose-tube optical fiber cable.

While cable 500 of FIG. 2 is a relatively simple, conceptual design, a cable 600 in FIG. 3 represents another design that may use technology disclosed herein to advantageously support specialized optical fibers 620 as disclosed herein, such as the optical fiber 100 of FIG. 1 or the optical fibers 510 of FIG. 2. As with the cable 500 of FIG. 2, the cable 600 shown in FIG. 3 may not be drawn to scale or show dimensions or geometric relationships disclosed herein, but features and elements of the cable 600, as now further explained, may be present with technology disclosed herein.

According to an aspect, the cable 600 includes a cable jacket 602 of materials and thicknesses disclosed above, similar to the cable jacket 502. Just beneath the cable jacket 602, the cable 600 includes a ripcord 604, which may be used to facilitate opening the cable jacket 602 to access contents therein, such as optical fibers 620. Such a cable jacket 602 may alternatively or further include embedded discontinuities of material (so-called 'fast-access features'), which may facilitate tearing open the cable jacket 602 to access contents therein, such as in place of the ripcord 604 or in addition thereto.

Beneath the cable jacket 602, the cable 600 of FIG. 3 includes water-swellable tape 626, which may carry super-absorbent polymer configured to expand if water enters the cable jacket 602 to thereby help block flow of water along the cable 600. While the cable 600 may be made entirely of dielectric materials (e.g., plastic, fabric, and glass), other cables that use technology disclosed herein may be armored, such as with a spirally-wrapped, corrugated, or otherwise arranged metallic layer adjoining the cable jacket 602, interior thereto, which may help prevent puncture or crushing of the respective cable 600.

Also, beneath the cable jacket 602, the cable 600 includes binder cords 606 wrapping around a first group 608 (e.g., first ring, outer ring) of buffer tubes 610. Alternatively, such a cable may include a "thin-film binder" instead of binder cords 606. The buffer tubes 610 themselves may hold optical fibers 620 as disclosed herein, such as the optical fiber 100 of FIG. 1. Interior to the first group 608 of buffer tubes 610, the cable 600 includes another water-swellable tape 612 and binder cords 614 holding a second group 616 (e.g., inner ring, inner group, inside group) of buffer tubes 610 supporting yet more optical fibers 620. Interior to the second group 616 of buffer tubes 610, the cable 600 of FIG. 3 further includes a water-swellable yarn 622 wrapped around an up-jacketed strength member 624. Up-jacketing, such as by extruding polyethylene 630 over a glass-reinforced plastic core 628, increases the diameter of the strength member 624 to fit more buffer tubes 610 in a second group 616 (e.g., inner group, inner ring).

Referring still to FIG. 3, according to an aspect of the present disclosure, the buffer tubes 610 may be at least partially wrapped around the strength member 624, within the cable jacket 602. As shown, the first group 608 is wrapped (helically) around the strength member 624 in a left-handed helix, while the second group 616 is wrapped around the strength member 624 in a right-handed helix. Use of a helix allows for consistent and uniform bending of the optical fibers 620 within the cable 600, as opposed to an SZ strand for example, which changes the angle of the buffer tube 610 with respect to the strength member 624 as direction of the SZ strand reverses along a length of the strength member 624. With that said, Applicants contemplate cable configurations with optical fibers as disclosed herein that may SZ stranded or otherwise stranded (see generally dotted lines extending from the buffer tube 506 in FIG. 2).

An aspect of the cable 600 in FIG. 3 (which may not be shown to scale) is the angle of the helix of the buffer tubes 610 with respect to the strength member 624. According to an aspect, geometry of the stranding of the buffer tubes 610 along the strength member 624 (or other cable component about which the buffer tubes 610 may be stranded) may be arranged so that the buffer tubes 610 (i.e. a center line extending lengthwise along a geometric centroid of the respective buffer tube 610 in cross section orthogonal to length thereof) and optical fiber(s) therein (generally positioned within a center of the buffer tube 610 or possibly skewed away from the strength member 624, when the cable 600 is unstretched) curve around the strength member 624 and bend at a consistent rate.

According to an aspect, the consistent rate of bending is controlled at least in part by a helix angle and resulting in a lay length (i.e. lengthwise distance along the cable 600 corresponding to one rotation of the respective buffer tube 610 fully 360° around the strength member 624 or around the center of the respective cable 600) greater than 50 mm, such as greater than 70 mm, such as greater than 100 mm, and/or a lay length less than 10 m, such as less than 5 m, such as less than 2 m when the cable 600 is resting in a straight orientation and in an unstrained state, such as when measured resting on a flat floor at sea level at 20° C. and zero humidity. With that said, as further demonstrated by the Examples modeled below, for comparable bending of contents of buffer tubes 610 with different size strength members 624, or for comparable bending of buffer tubes 610 between different levels of stacked layers, as shown with groups 608 and 616, the respective lay length may change in order to have a desired bending of the optical fibers 620.

According to an aspect the buffer tubes 610 are stranded in the respective cable 600 to bend no more (i.e. no tighter) than a bending radius of 200 mm (i.e. radius ≥200 mm) of the buffer tube 610 and/or of the optical fibers 620 therein, such as no more than a bending radius of 220 mm (i.e. radius ≥220 mm), such as no more than a bending radius of 250 mm (i.e. radius ≥250 mm), such as no more than a bending radius of 300 mm (i.e. radius ≥300 mm), and/or at least a non-infinite bending radius, such as a bending radius of 10 m or less, such as at least a bending radius of 5 m or less, such as at least a bending radius of 1 m or less of the respective buffer tube 610 and/or of the optical fibers 620 therein. However, optical fibers 620 having attributes of the optical fiber 100, such as the cladding 102 and capillaries 104 with nested-capillaries 108 defining the hollow core 106, may well have greater flexibility and tolerance for bending than the optical fiber 100, such as by selecting more flexible glass, narrowing the fiber diameter, coating selection, etc. As such, Applicants contemplate the cables may be configured for tighter radii of the optical fibers 620 and the buffer tubes 610 than 200 mm, such as less than 200 mm but at least 100 mm or even at least 50 mm.

Stranding of the buffer tubes 610, as well as optical fiber 620 contents thereof, allows for movement of the optical fibers 620 to lower stress positions within the cable 600 as the cable 600 strains, such as if the cable 600 is stretched in tension (e.g., by 0.005% strain, 0.05% strain, 0.1% strain, 0.3% strain, 0.5% strain, 1% strain), where lesser stain in the optical fibers 620 in turn may improve communication performance by reducing instances of attenuation and failure. Although counterintuitive, according to an aspect, lay length of the buffer tubes 610 in the first group 608, or a group further from the strength member 624 about which the buffer tubes 610 are stranded, is greater than the lay length of the second group 616, closer to the strength member 624, such as by at least 2 mm, such as at least 5 mm, such as at least 10 mm, and/or no more than 1 m, such as no more than 50 cm, such as no more than 10 cm. One might expect the opposite because the buffer tubes of the second group 616 bend around a smaller or tighter radius core than those of the first group 608, so a longer lay length of the second group 616 may compensate for the tighter core. However, Applicants may strand the first group 608 with a greater lay length than the second group 616 to help maintain core integrity, i.e. so the cable 600 holds together. For example, for a cable 600 with greater than 100 optical fibers but less than 250 optical fibers, the lay length of the first group may be greater than 100 mm but the lay length of the second group may be less than 100 mm (e.g. 110 mm and 82 mm respectively), and for a cable 600 with greater than 250 optical fibers, the lay length of the first group may be greater than 110 mm and the lay length of the second group (interior) may be less than 110 mm (e.g., 125 mm and 100 mm respectively).

Referring to FIG. 2, an optical fiber 510 (see, e.g., optical fiber 100 of FIG. 1) may have the length LF and may be disposed within an optical fiber cable 500 (FIG. 2), which itself may have a length LC that is less than LF, where the optical fiber 510 within the cable 500 may exhibit bending, even when the cable 500 is positioned in a substantially straight, unstretched manner. As used herein, the amount by which the length LF of the optical fiber 510 exceeds the length LC of the cable 500, in which the optical fiber 510 is disposed, is referred to as "excess fiber length" or EFL, which may be expressed as a percentage of the length LC of the cable 500.

EFL is in the cable 500 of FIG. 2 and the cable 600 of FIG. 3 may be largely a function of stranding of the buffer tubes 506, 610 in the respective cable 500, 600, and may be greater than zero; but due to long lay lengths, EFL may be less than 10%, such as less than 7%, such as less than 5%, such as less than 3%, and in some instances less than 2% or even 1% of the cable length LC, such as for at least some tubes in the respective cable (see generally second group 616 of the buffer tubes 610 of the cable 600 in FIG. 3).

According to an aspect, the buffer tubes 610 are extruded around the optical fibers 620, and the optical fibers 620 are moved along with the extrusion so as to limit excess fiber length ("EFL2") of the optical fibers 620 within the buffer tubes 610 with respect to length of the buffer tubes 610 (as opposed to EFL with respect to the length LC of the cable 600). As a result, the optical fibers 620 are positioned largely in the center CC of the respective buffer tubes 610 when the cable 600 is laying straight and unstretched; and as such have some room to migrate within the buffer tubes 610 to low-stress positions, such as closer or further from a central axis extending lengthwise of the optical fiber cable, or closer or further from alignment with the central axis, as the respective cable 500, 600 is bent, stretched, twisted, and/or compressed (e.g., the cable bends in an arc of 1500 mm, 1000 mm, 500 mm, 300 mm; the cable twists 1° per 15 m length, 1° per 2 m length, 3° per 2 m length, 10° per 2 m length, 15° per 1 m length; and/or stretches by 0.005% strain, 0.05% strain, 0.1% strain, 0.3% strain, 0.5% strain, 1% strain, such as with free ends of the cable locked in epoxy or otherwise pinned). According to an aspect, optical fibers 620 in at least one of the buffer tubes 610 of the cable 600 (or cable 500) have EFL2 greater than or equal to zero to less than 5% with respect to the length of the buffer tube 610, such as less than 3%, such as less than 2%, such as less than 1%, or even less than 0.5% for example.

Examples

Figure 4:
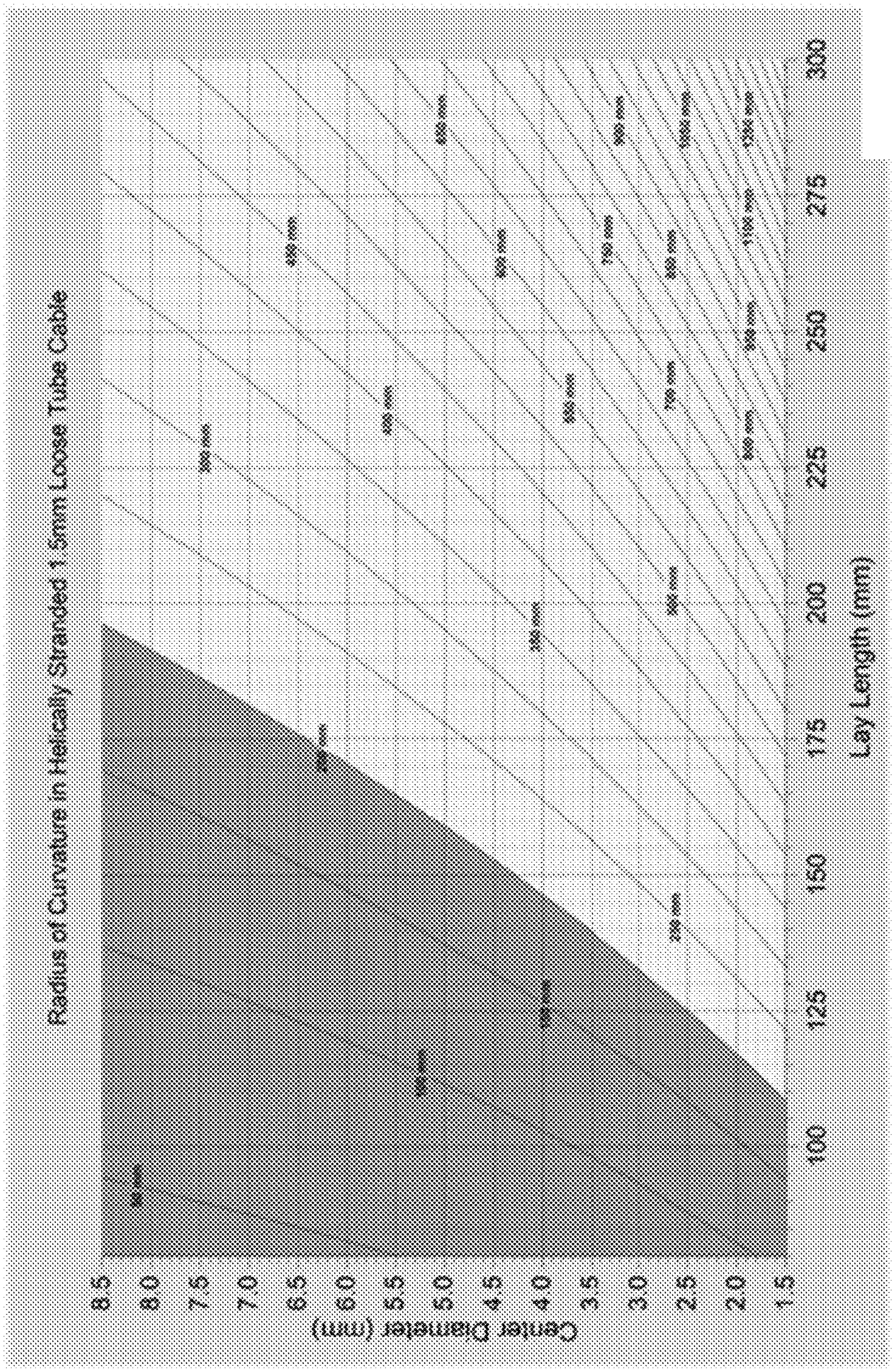
FIG. 4 is a plot illustrating relationships among various cable construction parameters according to a first example model.

The inventors modeled radius of curvature of optical fibers 510 disposed within the buffer tubes 506 of the cable 500 of FIG. 2 as a function of diameter of the strength member 508 and outside diameter of the buffer tubes 506 (see DBT in FIG. 2). The model assumes that the buffer tubes 506 have substantially identical outside diameters and lay lengths of the helical stranding of the buffer tubes 506. Referring now to FIG. 4, a plot 800 illustrates a relationship between lay length of the buffer tubes 506, diameter of the strength member 508, and radius of curvature of the optical fibers 510.

In the plot 800, lay length in millimeters is shown along the x-axis and diameter of the strength member 508 is shown along the y-axis. In the plot 800, a curve is shown for each of several radii of curvature of the optical fibers 510, where each curve indicates combinations of lay length and central strength member diameter that yield the indicated radius of curvature. The plot 800 assumes zero EFL for the optical fibers 510 with respect to the buffer tubes 506, and a 1.5 mm outside diameter of the buffer tubes 506.

As in the plot 800, combinations of differently-sized lay lengths and central strength member diameters that yield a radius of curvature for an optical fiber of tighter than 200 mm are shaded to indicate a likelihood of permanent damage to the optical fiber 510 for such combinations, where bending exceeding 200 mm radius of curvature (i.e. bend radius <200 mm) is a threshold in the model. For example, embodiments of the cable 500 may satisfy the inequality $d \leq 0.092l - 10.5$, where d is the diameter of the strength member 508 (e.g., central strength member) and l is the lay length of the buffer tubes 506, are likely to maintain the optical fiber 510 with a minimum radius of curvature to avoid fiber breaks according to the example model when the buffer tubes 506 having an outside diameter of 1.5 mm±5%. Other factors too may play a role, such as fiber diameter and/or length, where as diameter decreases the fiber may allow for tighter bending and longer lengths may be facilitated by less bending. As such, Applicants contemplate the 200 mm radius of curvature may not be a critical threshold in all cables and fibers disclosed herein, as further explained below.

Figure 5:
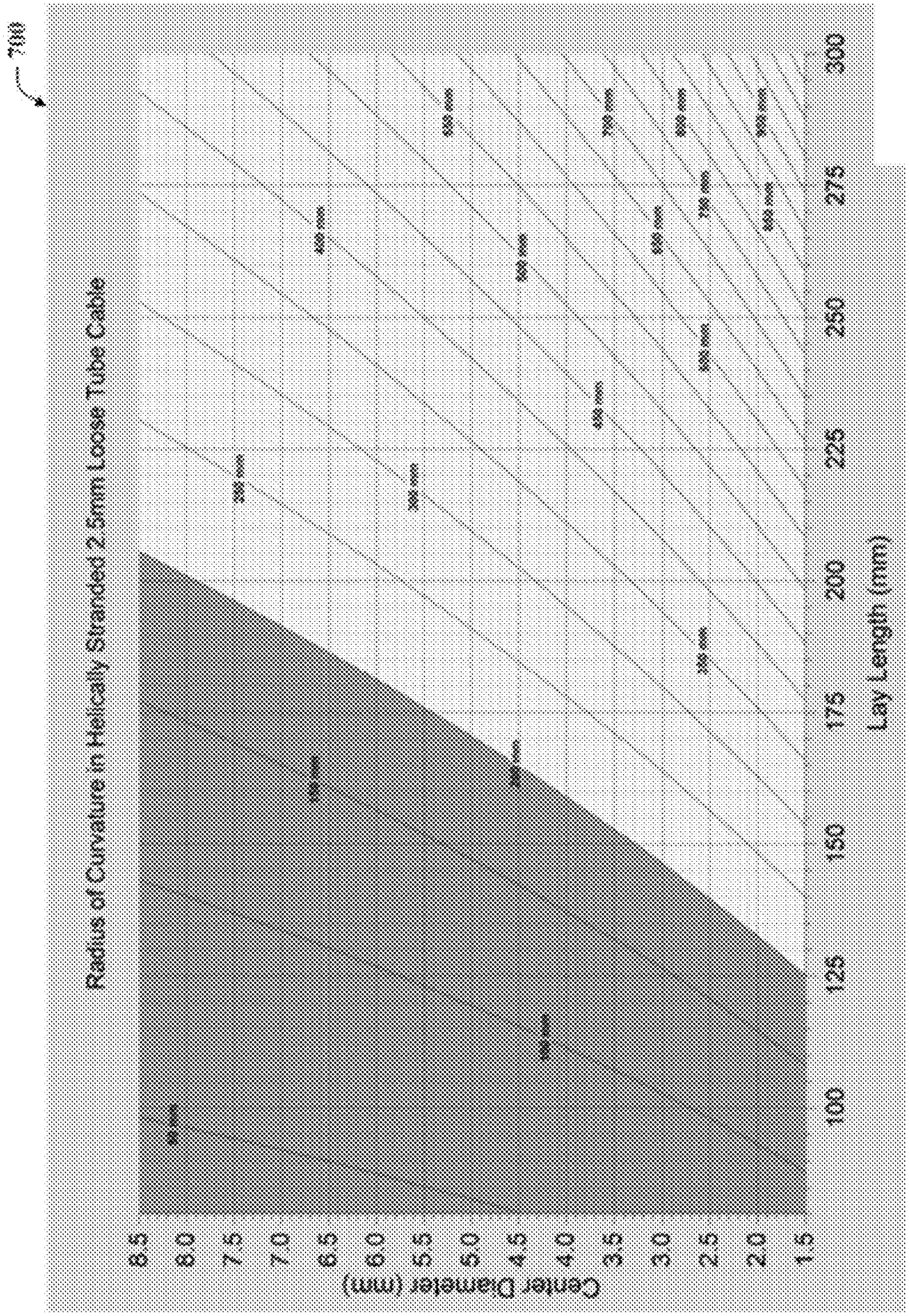
FIG. 5 is a plot illustrating relationships among various construction parameters according to a second example model.

Referring now to FIG. 5, plot 700 illustrates another modeled relationship between lay length of the buffer tubes 506, diameter of the strength member 508 (e.g., central strength member), and radius of curvature of optical fibers 510. The plot 700 is substantially similar to the plot 800 of FIG. 4, but illustrates the relationships among lay length, central strength member diameter, and radius of curvature of the optical fibers 510 when the buffer tubes 506 have outside diameters of 2.5 mm. Embodiments of the optical fiber cable 500 where the buffer tubes 506 have outside diameters of 2.5 mm±5% and that satisfy the inequality $d \leq 0.075l - 6.875$ may be likely to maintain optical fibers 510 with a minimum radius of curvature to avoid breaks of the optical fibers according to the second example model.

According to an aspect, the buffer tubes 506 may have an outer diameter (from one outside surface of the buffer tube, through buffer tube, through the geometric center orthogonal to length of the space within the buffer tube, back through the buffer tube wall, and to the other outside surface of the buffer tube) of no more than 5.0 mm, such as no more than 3.0 mm, such as no more than 2.75 mm, and/or at least 0.5 mm, such as at least 0.8 mm. Similarly, according to an aspect, the buffer tubes 506 may have an inner diameter (from one inside surface of the buffer tube, through the geometric center orthogonal to length of the space within the buffer tube, and to the other inside surface of the buffer tube) of no more than 4.0 mm, such as no more than 2.0 mm, such as no more than 1.75 mm, and/or at least 0.3 mm, such as at least 0.5 mm.

What has been described above includes examples of one or more embodiments. It is, of course, not possible to describe every conceivable modification or alteration of the above systems, devices, or methodologies for purposes of describing the aforementioned aspects, but one of ordinary skill in the art can recognize that many further modifications and permutations of various aspects are possible. For example, in any of the cables 500, 600 the optical fibers 100, 510, 620 can be configured as loose fibers or intermittently-bonded, non-planar ribbons. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Figure 6:
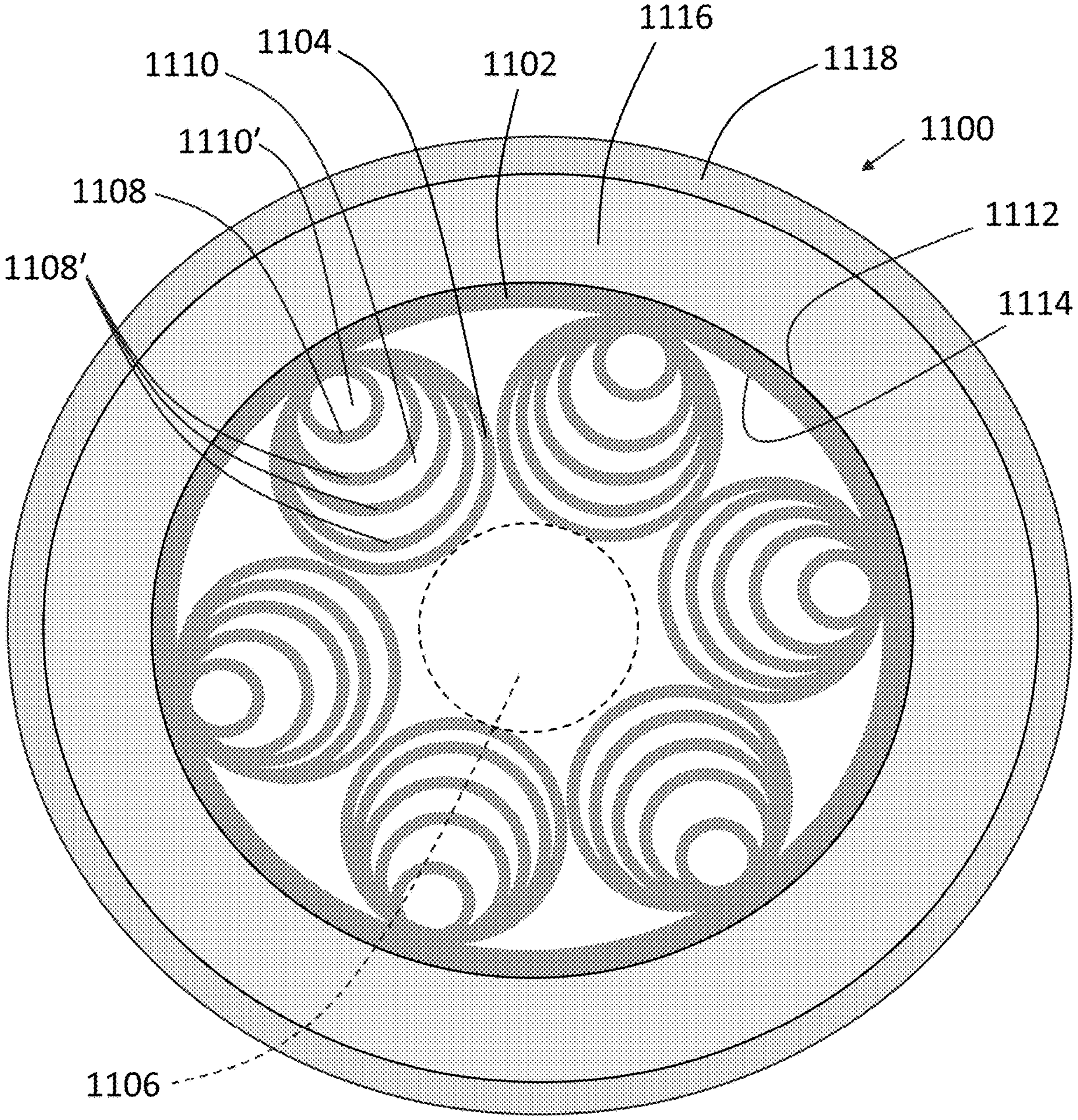
FIG. 6 is a cross-sectional view of another optical fiber according to an aspect of the present disclosure.

Referring to FIG. 6, according to an aspect of the present disclosure, an optical fiber 1100 comprises a primary-capillary 1104 comprising glass and surrounding an interior passage 1110 thereof. A nested-capillary 1108 is positioned within the interior passage 1110 of the primary-capillary 1104, where the nested-capillary 1108 has an open space 1110' extending lengthwise therein. The open space of the interior passage 1110 and the open space 1110' of the nested-capillary 1108 may be circular in cross-section, as shown, or may be otherwise shaped, such as when surrounding structures interior thereto, as in the case of the interior passage 1110 shown in FIG. 6.

According to an aspect, the nested-capillary 1108 only fills a portion of the interior passage 1110 of the primary-capillary 1104 such that the interior passage 1110 is sized to fit at least another two more nested-capillaries therein of at least the same cross-sectional geometry as nested-capillary 1108 (i.e. the smallest nested-capillary of the optical fiber) or wider, as shown with nested-capillaries 1108'. For example, at least some such additional nested-capillaries 1108' are shown in FIG. 6 to be nested with respect to one another in the interior passage 1110 of the primary-capillary 1104.

The optical fiber 1100 of FIG. 6 further includes a cladding 1102 having a round cross-section (i.e. arcing, oblong, elliptical, oval, circular) and surrounding the primary-capillary 1104 and in turn the nested-capillary 1108. The primary-capillary 1104 is fixed to an interior surface 1114 of the cladding 1102, where the cladding 1102 likewise surrounds at least two other such primary-capillaries 1104 fixed to the interior surface 1114 thereof, directly as shown in FIG. 6; or indirectly by way of another structure of the optical fiber 1100, such as the primary-capillary 1104. Each of the primary-capillaries 1104 are positioned around the interior surface 1114 of the cladding 1102. Portions of exteriors of each of the primary-capillaries 1104 line a hollow core 1106 between the portions, where the hollow core 1106 is configured to convey an optical signal communicated lengthwise along the hollow core 1106. As such, the cladding 1102, the primary-capillary 1104, and the nested-capillary 1108 each form part of the optical fiber 1100. Still referring to FIG. 6, the optical fiber 1100 may include one or more coating layers 1116, 1118 on the outer surface 1112 of the cladding 1102, where these coating layers 1116, 1118 may be primary- and secondary-coating layers, as disclosed above.

Figure 7:
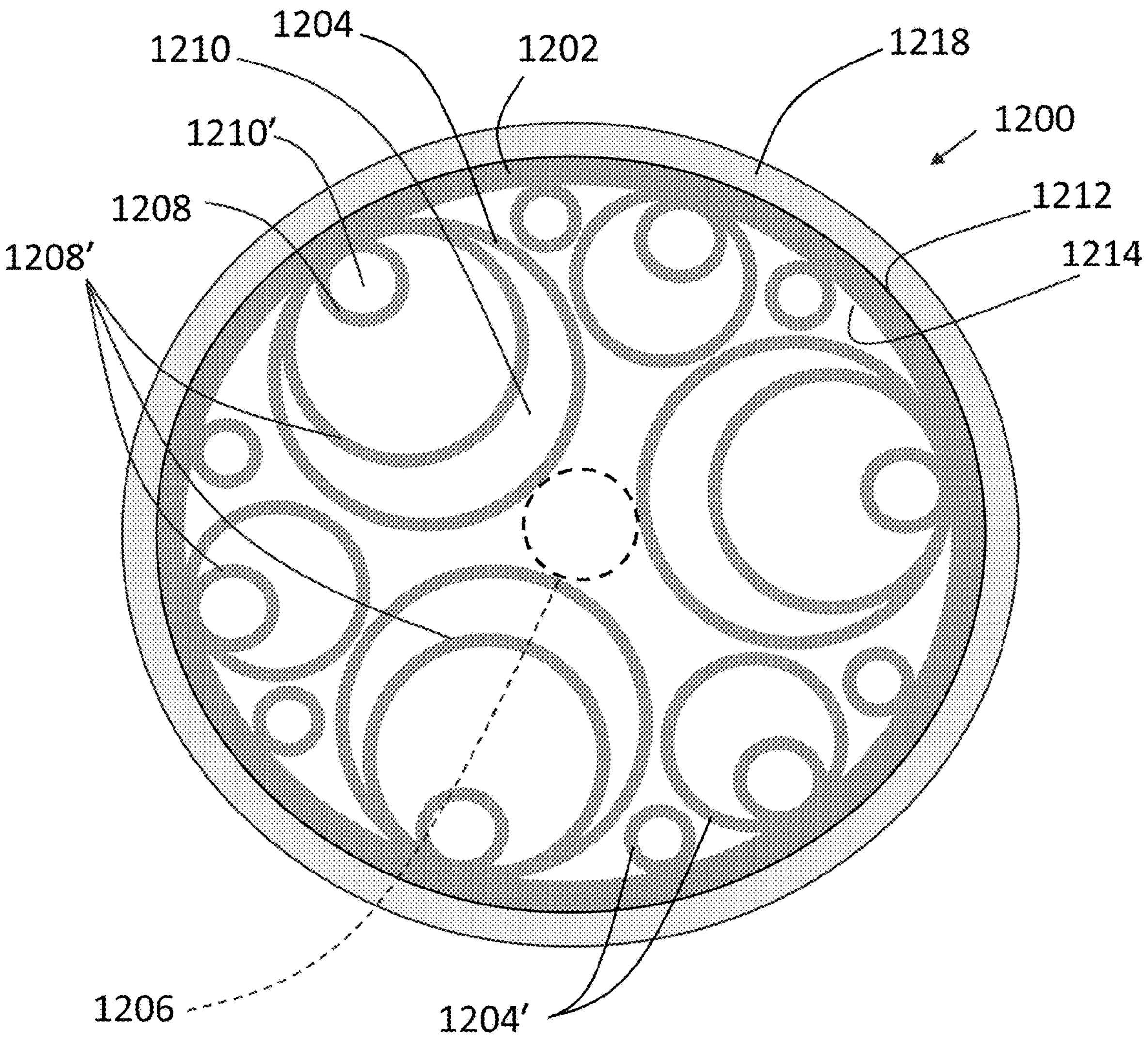
FIG. 7 is a cross-sectional view of yet another optical fiber according to an aspect of the present disclosure.

Referring to FIG. 7, according to an aspect of the present disclosure, an optical fiber 1200 comprises a primary-capillary 1204 comprising glass and surrounding an interior passage 1210 thereof. A nested-capillary 1208 is positioned within the interior passage 1210 of the primary-capillary 1204, where the nested-capillary 1208 has an open space 1210' extending lengthwise therein. That said, primary-capillaries 1204' of the optical fiber 1200 or other such optical fibers may or may not surround nested-capillaries 1208, 1208', as shown in FIG. 7.

According to an aspect, the nested-capillary 1208 only fills a portion of the interior passage 1210 of the primary-capillary 1204 such that the interior passage 1210 is sized to fit at least another two more nested-capillaries therein. For example, at least some additional nested-capillaries 1208' are shown in FIG. 7 to be nested with respect to one another in the interior passage 1210 of the primary-capillary 1204.

The optical fiber 1200 of FIG. 7 further includes a cladding 1202 having a round cross-section and surrounding the primary-capillary 1204 and in turn the nested-capillary 1208. The primary-capillary 1204 is fixed to an interior surface 1214 of the cladding 1202, where the cladding 1202 likewise surrounds at least two other primary-capillaries 1204, 1204' fixed to the interior surface 1214 thereof, directly as shown in FIG. 7. Each of the primary-capillaries 1204 are positioned around the interior surface 1214 of the cladding 1202. Portions of exteriors of the primary-capillaries 1204 line a hollow core 1206 between the portions, where the hollow core 1206 is configured to convey an optical signal communicated lengthwise along the hollow core 1206.

The primary-capillaries 1204 may be distinguished from nested-capillaries 1208 because the primary-capillaries 1204, 1204' are not enclosed by wider capillaries (but are surrounded by the cladding 1202) and at least some of the primary-capillaries 1204 directly border the hollow core 1206. As such, the cladding 1202, the primary-capillary 1204, and the nested-capillary 1208 each form part of the optical fiber 1200. The optical fiber 1200 includes a coating layer 1218 on the outer surface 1212 of the cladding 1202.

Figure 8:
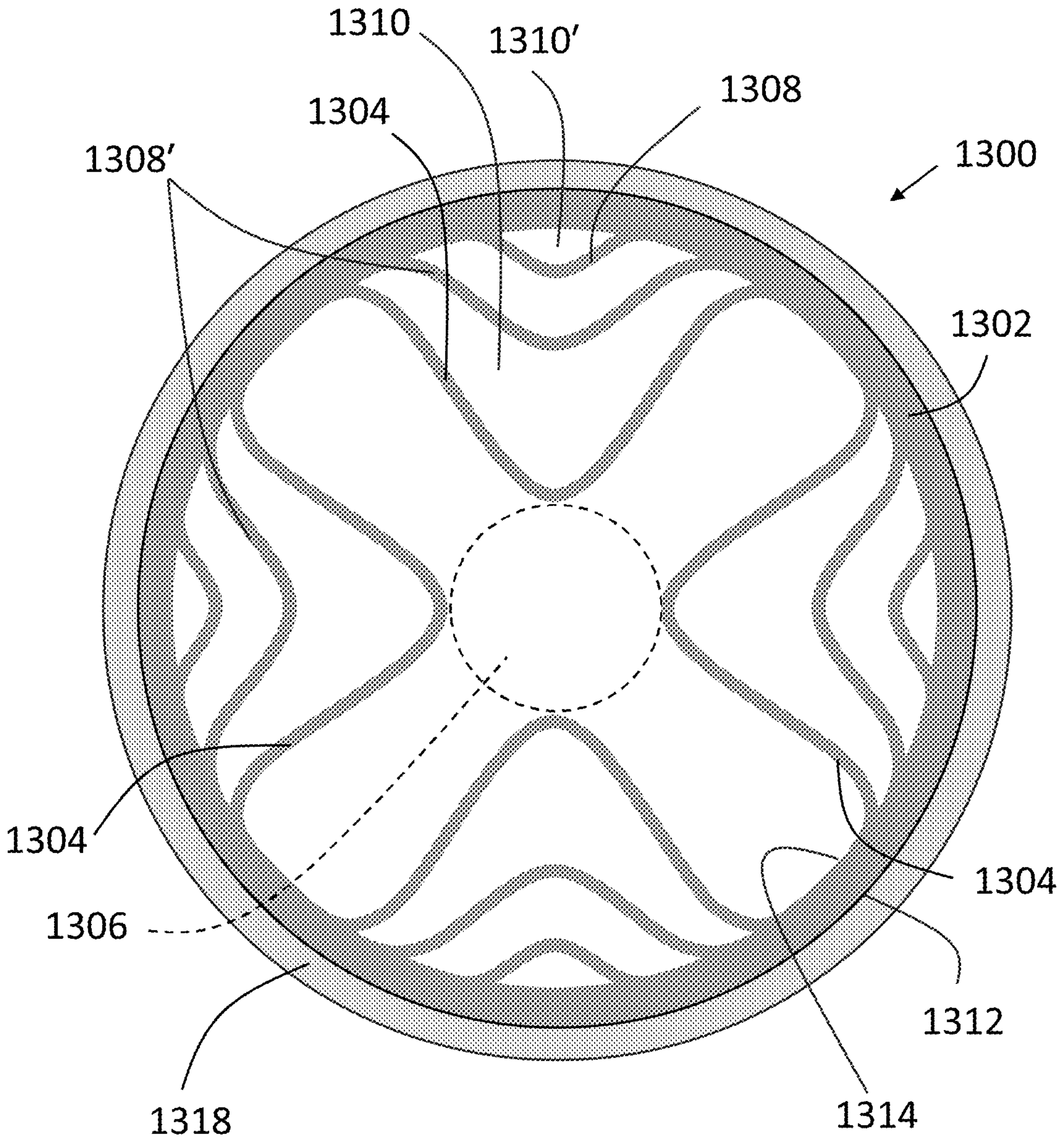
FIG. 8 is a cross-sectional view of still another optical fiber according to an aspect of the present disclosure.

Referring now to FIG. 8, according to an aspect of the present disclosure, an optical fiber 1300 comprises a primary-capillary 1304 comprising glass and surrounding an interior passage 1310 thereof. A nested-capillary 1308 is positioned within the interior passage 1310 of the primary-capillary 1304, where the nested-capillary 1308 has an open space 1310' extending lengthwise therein.

As indicated above, primary-capillaries 1304 may be circular, oval, elliptical in cross-section as shown in FIG. 1 and FIGS. 6-7, or the primary-capillaries 1304 may be otherwise shaped (e.g., arch-shaped, minor sector shaped i.e. pie-slice shaped). As discussed above, the primary-capillaries 1304 may be directly or indirectly coupled to and/or partially formed from the inner surface 1314 of the cladding 1302, such as in a case where a capillary in cross-section includes an arch with each leg thereof anchored on the inner surface 1314 of the cladding 1302 as shown in FIG. 8.

According to an aspect, the nested-capillary 1308 only fills a portion of the interior passage 1310 of the primary-capillary 1304 such that the interior passage 1310 is sized to fit at least another two more nested-capillaries therein. For example, at least some additional nested-capillaries 1308' are shown in FIG. 8 to be nested with respect to one another in the interior passage 1310 of the primary-capillary 1304.

The optical fiber 1300 of FIG. 8 further includes a cladding 1302 having a round cross-section and surrounding the primary-capillary 1304 and in turn the nested-capillary 1308. The primary-capillary 1304 is fixed to an interior surface 1314 of the cladding 1302, where the cladding 1302 likewise surrounds at least two other such primary-capillaries 1304 fixed to the interior surface 1314 thereof, directly as shown in FIG. 8. Each of the primary-capillaries 1304 are positioned around the interior surface 1314 of the cladding 1302. Portions of exteriors of the primary-capillaries 1304 line a hollow core 1306 between the portions, where the hollow core 1306 is configured to convey an optical signal communicated lengthwise along the hollow core 1306.

While geometries of the elements of optical fibers disclosed herein are shown in the figures to be precise and uniform patterns, neatly arranged about the respective cores, Applicants recognize that in practice such geometries may vary from optical fiber to optical fiber and even along a length of an optical fiber. Circular primary-capillary or nested-capillary geometries may flatten to ovals, elements designed to be identical to one another may not be perfectly identical in practice, etc. A thin jacket drawn over internal cable components may have a lumpy circular cross-section rather than a perfect circle. As such, geometry describing elements of optical fibers and cables is intended to be descriptive to a reasonable degree, not necessarily to ideal mathematical precision.

Figure 9:
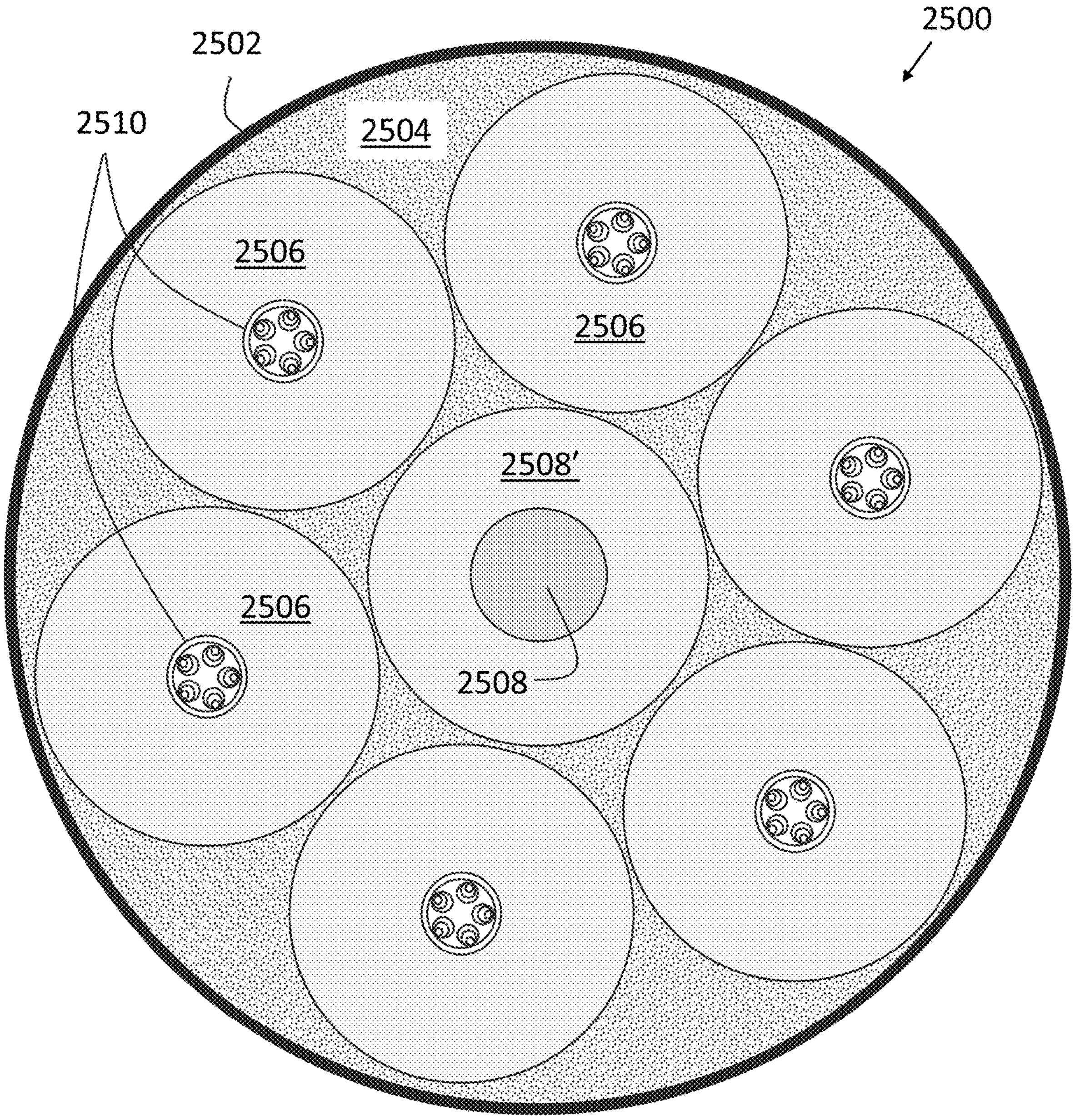
FIG. 9 is a cross-sectional view of another optical fiber cable according to an aspect of the present disclosure.

Referring to FIG. 9, a cable 2500 is shown in cross-section and comprises a cable jacket 2502 surrounding a strength member 2508, buffer tubes 2506, and optical fibers 2510, as disclosed herein, which comprise claddings, primary-capillaries and nested-capillaries therein, as well as hollow passages for optical signal communication (see FIGS. 1, 6-8 for exemplary details of at least some such optical fibers). Notably, while FIG. 9 shows 6 buffer tubes 2506 stranded around the strength member 2508 with up-jacketing 2508', Applicants contemplate other numbers of buffer tubes, such as 4, 8, 9, 12, 18; and even multiple layers of stranded buffer as shown in FIG. 3 for example.

The buffer tube 2506 may comprise a polymer and/or plastic (e.g., fluoropolymers, polyvinylidene fluoride, polytetrafluoroethylene, polyurethane; polyvinyl chloride; low-smoke zero-halogen material; thermoplastic polymers; thermoplastic elastomer, thermoplastic polyester elastomers). According to an aspect, the buffer tube 2506 is extruded over the optical fiber 2510 (including over coating(s) thereon) without free space between the optical fiber 2510 and the buffer tube 2506 and is a tight buffer. Put another way, in contrast to at least some other buffer tubes disclosed herein (see, e.g., buffer tubes 506 in FIG. 2), the buffer tubes 2506 are tight buffers, where the optical fibers 2510 are held in and by the buffer tubes 2506. That said, the jacket 2502 of the cable 2500 is designed in terms of flexibility of material thereof (e.g., polymer as disclosed above), space of interior cavity 2504 formed thereby (e.g., wider than the buffer tubes 2506, as disclosed above), and dimensions of the buffer tubes 2506, such that the buffer tubes 2506 may move relative to the jacket 2502, relative to the strength member 2508 (and up-jacketing 2508'), and/or relative to one another as the cable 2500 is twisted, bent, or stretched (elongated or contracted) to allow the optical fibers 2510 to move to lower stress positions within the jacket 2502 to mitigate signal loss through hollow passages therein.

As indicated above, the buffer tubes 2506, according to an aspect of the present disclosure, may comprise a tight buffer, such as having a widest cross-sectional dimension of the buffer tube 2506 that is at least 0.5 mm for example. According to an aspect of the present disclosure, the buffer tube 2506 may having a cross-sectional dimension orthogonal to a length thereof at least five times that of the cladding of an optical fiber 2510 therein. For example, the optical fiber may have a cladding with a cross-sectional dimension (e.g., diameter for circular cross-section) of 125 μm and the buffer tube may have a cross-sectional dimension (e.g., diameter) of 900 μm. That said, Applicants contemplate, especially with tight-buffered optical fibers, a narrower ratio, such as the buffer tube having a cross-sectional dimension (from outside-surface-to-outside-surface through geometric center) that is less than 10 times that of the cladding, such as even less than 5 times that of the cladding, and/or at least more than double, such as more than triple. Notwithstanding the buffer tube may have a thickness greater than that of a primary and/or secondary coating of the optical fiber such as at least twice, at least three-times, five-times, and/or no more than 1000-times.

According to an aspect, each of the buffer tubes are stranded around the strength member within the cable jacket such that the optical fibers each have a longer length then the optical fiber cable. Stranding may be helical, so-called S-Z, or otherwise. For cables with thinner jackets (e.g., only a thin-film, such as a polymer less than 1.5 mm thick and/or at least m thick), helical stranding may be preferred. According to an aspect, stranding of the buffer tubes is such that the buffer tubes bend no tighter than an arc of 200 mm radius within the cable jacket. That said, while aspects of the present disclosure relate to stranded buffer tubes and optical fibers in cables; other aspects may be independent of stranding or cables, such as buffered optical fibers comprising elements herein (e.g., jacket, relative buffer tube to fiber cladding sizing, etc.), stacks of ribbons, flexible ribbons of hollow-core fibers, etc.

Figure 10:
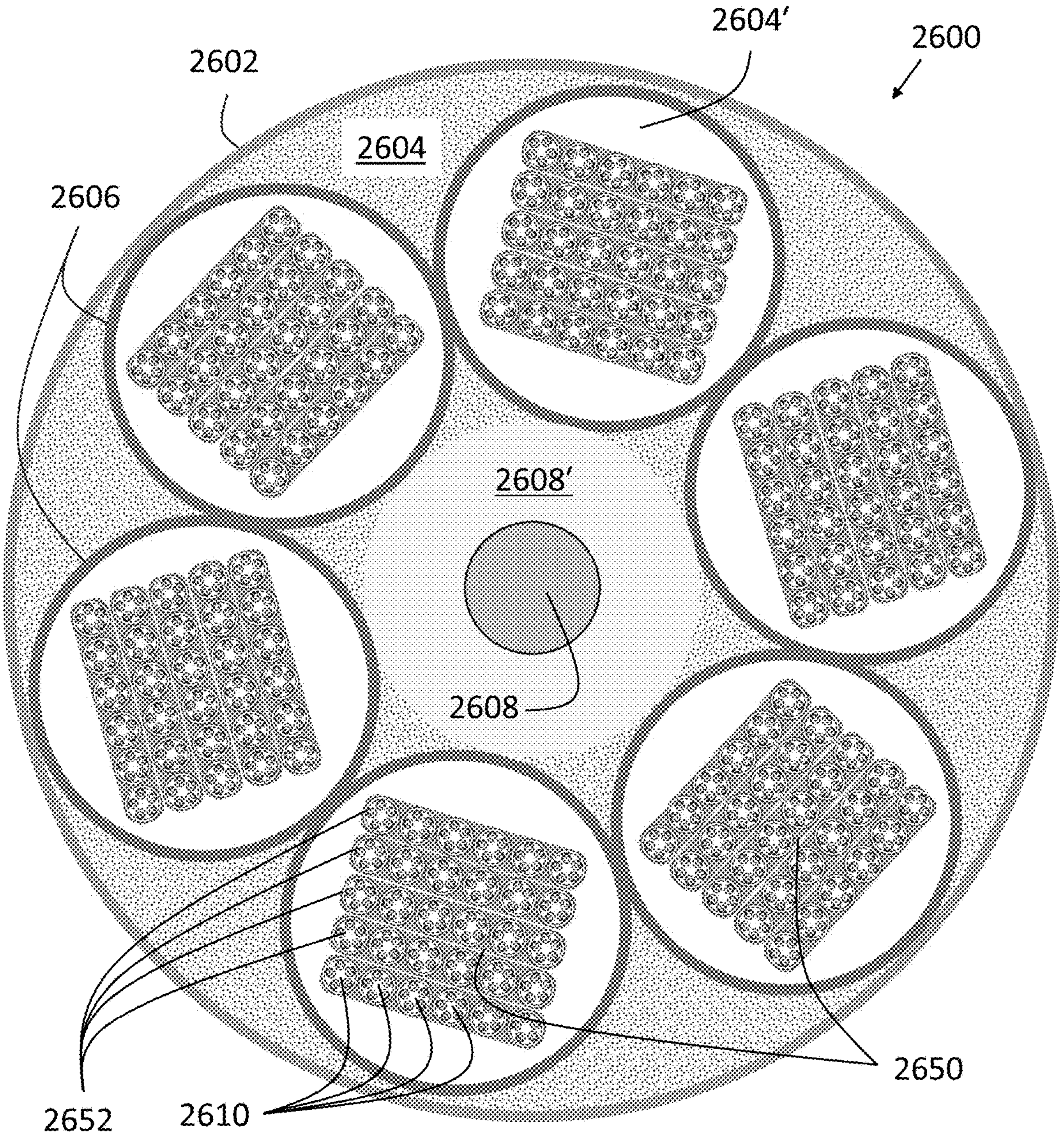
FIG. 10 is a cross-sectional view of yet another optical fiber cable according to an aspect of the present disclosure.

Referring to FIG. 10, a cable 2600 is shown in cross-section and comprises a cable jacket 2602 surrounding an interior space 2604 at least partially filled by a strength member 2608, such as glass-reinforced composite rod, which may be up-jacketed 2608', buffer tubes 2606, and optical fibers 2610. As disclosed herein, at least one, some, or all of the optical fibers 2610 comprise a cladding, primary-capillaries and nested-capillaries therein, as well as a hollow passage for optical signal communication (see FIGS. 1, 6-8 for exemplary details of at least some such optical fibers).

While the buffer tubes 2506 in FIG. 9 were tight buffers, the buffer tubes 2606 in FIG. 10 may be significantly wider, include free space 2604' sufficient to hold a stack 2650 of ribbons 2652 of the optical fibers 2610. Applicants note that the interior space 2604 and the free space 2604' may include content, such as loose elements, such as water-blocking tape carrying super-absorbent polymer, water-blocking fibers carrying super-absorbent polymer, Kevlar strands for bearing tensile load; or grease, foam, etc., such that, as the cable bends, stretches, etc. the optical fibers 2610 and/or the buffer tubes 2606 are at least partially free to move therein to low-stress positions to mitigate signal attenuation in the hollow passage of the optical fiber(s) 2610.

The ribbons 2652 may each include a plurality of optical fibers 2610, such as 3, 4, 5, 6, or more bonded to one another, such as in a straight line, as shown in FIG. 10. Put another way, the ribbons 2652 include optical fibers 2610 (a number thereof greater than 1 optical fiber 2610, such as >3, >4, >7, >11, >15, and/or <45) coupled to one another by adhesive 714, such as ultra-violet-light-cured epoxy, thermoset adhesive, thermoplastic, resin, acrylate, polyethylene, polyvinyl chloride, which may include primary and secondary coatings, similar to optical fiber coatings disclosed above (i.e. hard surrounding soft coatings).

As shown in FIG. 10, ribbons 2652 may be placed on top of one another to form the stacks 2650. If such a stack 2650 has ribbons 2652 of different widths, wider ribbons 2652 may be positioned in a center of the stack 2650, with steps down in width toward extreme top and bottom layers of the stack 2650.

According to an aspect, the stack 2650 may twist along a length thereof within and with respect to the buffer 2606, such as a rate of rotation of at least a full rotation (360°) per 10 m length of cable 2600 on average, such as at least a full rotation per 5 m length of cable 2600 on average, such as at least a full rotation per 2 m, 1 m, or even 0.5 m length of the cable 2600. Such rotation of the stack may help reduce stress applied to optical fibers 2610 of the respective ribbons 2652 of the respective stack 2650. As such, the ribbon stack 2650 may twist within the respective buffer tube 2606, while the buffer tube 2606 is stranded with other such buffer tubes around the strength member 2608. According to an aspect, the twisting and stranding may be such that the optical fibers 2610 bend no tighter than an arc of 200 mm radius, such as no tighter than an arc of 250 mm radius, 300 mm radius as the cable 2600 is straight and unstretched. In other contemplated embodiments, the optical fibers 2610 may bend tighter than an arch 200 mm radius, as disclosed above.

Figure 11:
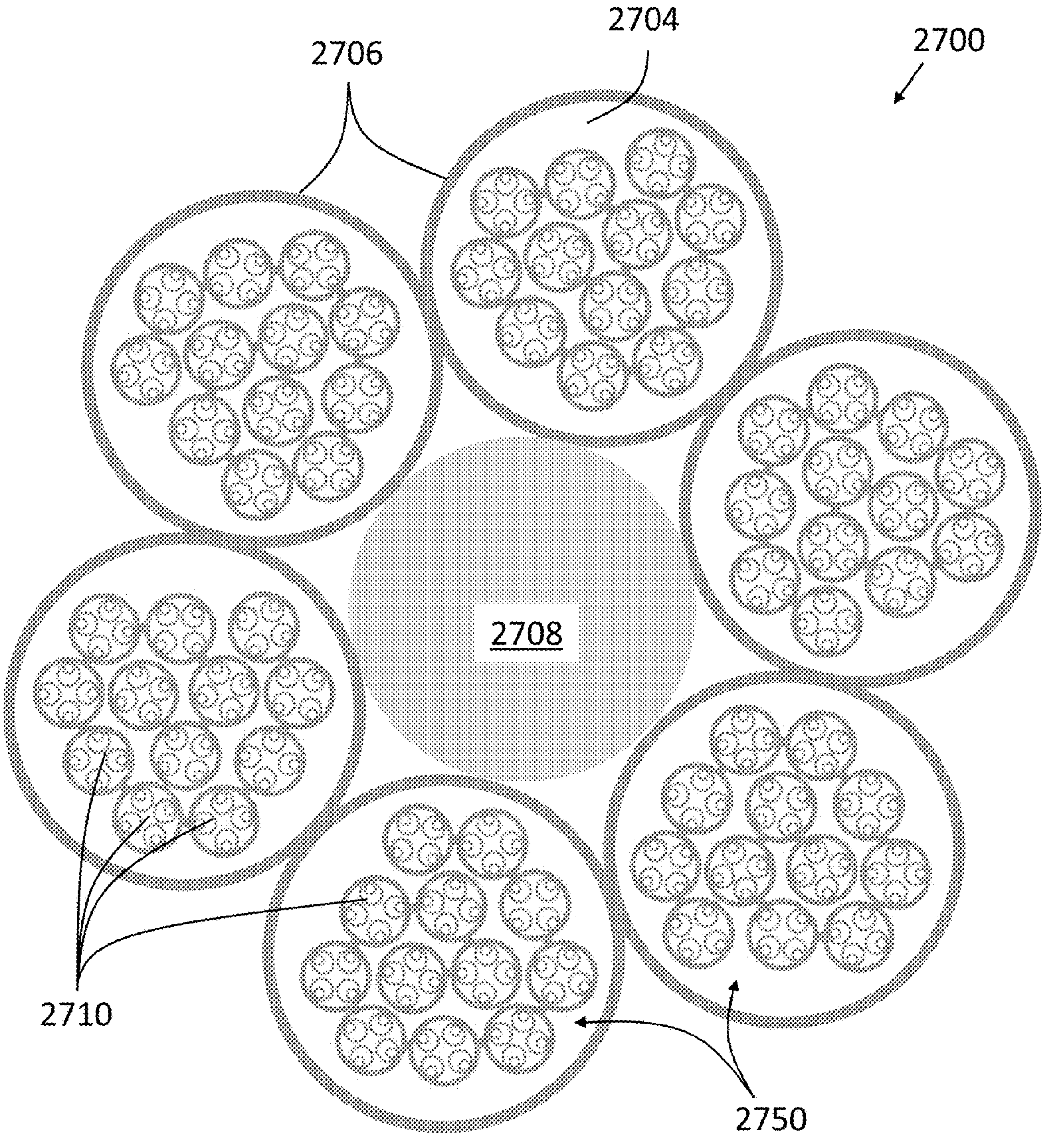
FIG. 11 is a cross-sectional view of still another optical fiber cable according to an aspect of the present disclosure.

Referring now to FIG. 11, an optical fiber cable 2700 is illustrated in cross-section. The cable 2700 does not include a cable jacket, but does include buffer tubes 2706 supporting an optical communication element of the cable, such as optical fibers 2710, at least one of which, some of which, and/or all of which may correspond to optical fibers disclosed herein, which include a hollow passage for signal communication. The cable 2700 is of a configuration that may be particularly useful for indoor applications, such as routing optical fibers in a data center, because the cable provides easy access to the buffer tubes 2706, which may be helically wound around strength member 2708.

According to an aspect, and not limited to the jacket-less cable design of the cable 2700, the optical fibers 2710 are bonded to one another, to form a bendable ribbon 2750. As shown in FIG. 11, the bendable ribbon 2750 of bonded optical fibers 2710 may be rolled into a spiral or otherwise arranged into a condensed configuration, where the optical fibers 2710 are positioned next to one another in a non-linear arrangement when viewed in cross section, as shown in FIG. 11. Bonding of the optical fibers 2710 may be with adhesives, as disclosed above, and the bonding may be continuous or may be done via intermittent tacking locations. Such an arrangement if combined with sufficient free space 2704 in the buffer tubes 2706, as disclosed above, may allow for greater freedom of the ribbons 2750 to move to lower-stress positions as the cable 2700 bends, twists, or stretches for example. According to an aspect of the present disclosure such a ribbon may include one or more optical fibers as disclosed herein, possibly in combination with one or more glass-core optical fibers, independent of being located in a cable or in a buffer tube for example.

According to an aspect of the present disclosure, for example, the optical fiber 2710 of the cable 2700 may be positioned relatively closer to a center of the cable 2700 than shown (such as closer to the strength member 2708), when the cable is stretched longitudinally (e.g., at 50° C., with polymer of the cable jacket 2702 in a stretched state; or when the cable 2700 is tensioned under its own weight, such as between telephone poles). As such, available space for movement of the optical fibers 2710 compensates for glass of the optical fiber(s) having greater modulus of elasticity (e.g., much greater; ≥x50, ≥x100 on average over elastic range of the glass; e.g., 70 GPa for the glass versus 0.1 GPa for the polymer) and lower coefficient of thermal expansion (e.g., much lower; ≤x(⅕), ≤x(1/10) on average over the temperature range of 0-300° C.; e.g., 9E-6/° C. for the glass versus 160E-6/° C. for polymer) than polymer of the cable jacket 2702 or other parts of the cable 2700.

The construction and arrangements of the cable, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. For example, some indoor cable may include jacketing material comprising fire-resistant or -retardant compounds or fillers. Other cables may comprise stranded elements (e.g., buffer tubes, tight-buffered fibers, etc.) helically wound around a central member (e.g., strength member, buffer tube with central cavity comprising an optical element, such as optical fibers disclosed herein or other optical fibers, or electrically-conductive wiring, etc.) with or without a jacket—the stranded elements may form the outermost structure of the cable—or with a jacket formed from paper, foil, binder material. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive technology.

What is claimed is:

1. An optical fiber cable, comprising:

a first primary-capillary comprising glass and surrounding an interior passage thereof;

a first nested-capillary positioned within the interior passage of the first primary-capillary, wherein the first nested-capillary only fills a portion of the interior passage of the first primary-capillary, and wherein the first nested-capillary also comprises an open space extending lengthwise therein;

a cladding having a round cross-section and surrounding the first primary-capillary and in turn the first nested-capillary, wherein the first primary-capillary is fixed to an interior surface of the cladding;

two other primary-capillaries in addition to the first primary-capillary, the two other primary-capillaries also fixed to the interior surface of the cladding;

wherein portions of exteriors of each of the first primary-capillary and the two other primary-capillaries line a hollow core therebetween, the hollow core configured to convey an optical signal communicated lengthwise therealong, whereby the cladding, the first primary-capillary, the first nested-capillary, and the two other primary-capillaries each form part of a first optical fiber;

a coating layer surrounding the first cladding of the first optical fiber, wherein the coating layer comprises an ultra-violet-light curable and/or thermoset polymer;

a first buffer tube comprising thermoplastic and having a cross-sectional dimension orthogonal to a length thereof, measured from an exterior thereof through a geometric center thereof and to an opposing exterior thereof, that is at least twice that of the coating layer of the first optical fiber;

wherein the first buffer tube surrounds the first optical fiber;

two other buffer tubes in addition to the first buffer tube, wherein the two other buffer tubes each surround at least one other optical fiber;

a strength member comprising fiber-reinforced plastic;

a cable jacket surrounding the strength member, the first buffer tube, and the two other buffer tubes;

wherein each of the first buffer tube and the two other buffer tubes are stranded around the strength member within the cable jacket such that the first optical fiber has a longer length than the optical fiber cable, and wherein the first optical fiber is loosely positioned in the first buffer tube and/or the first buffer tube is loosely positioned within the cable jacket such that the first optical fiber is at least partially free to move relative to the first buffer tube and/or relative to the strength member, to a lower stress position, as the cable bends in an arc of 500 mm, twists 3° per 2 m length, and/or stretches by 0.3% strain.

2. The optical fiber cable of claim 1, wherein the stranding is such that the first buffer tube bends no tighter than an arc of 200 mm radius within the cable jacket.

3. The optical fiber cable of claim 1, wherein the first optical fiber has a length greater than or equal to that of the first buffer tube, and less than 3% longer than the first buffer tube.

4. The optical fiber cable of claim 1, wherein the coating layer of the first optical fiber comprises both a primary coating and a secondary coating, the primary coating softer than the secondary coating, and the secondary coating exterior to the primary coating.

5. The optical fiber cable of claim 1, wherein the first buffer tube is a tight buffer overlaying the coating layer having an outside diameter of at least 500 km.

6. The optical fiber cable of claim 1, wherein the cladding comprises glass, wherein the glass of the cladding comprises, in terms of mole percent on a representative oxide basis, at least 60 mol % silica, wherein the glass of the cladding has a coefficient of thermal expansion and a modulus of elasticity, wherein the cable jacket comprises a thermoplastic polymer, wherein the thermoplastic polymer has a coefficient of thermal expansion greater than that of the glass of the cladding and a modulus of elasticity less than that of the glass of the cladding.

7. The optical fiber cable of claim 1, wherein when the optical fiber cable is at 50° C., tension in the strength member opposes compression in the cable jacket, while the optical fibers experience stress less than 5 MPa.

8. The optical fiber cable of claim 1, wherein when the optical fiber cable is at 50° C., hollow cores of the optical fibers move closer to the strength member on average than when the optical fiber cable is at 20° C.

9. The optical fiber cable of claim 1, wherein each of the primary-capillaries are spaced apart from one another around the interior surface of the cladding.

10. The optical fiber cable of claim 1, wherein the buffer tubes are a first group, wherein the optical fiber cable further comprises a second group of buffer tubes overlaying the first group, wherein the first and second groups are helically stranded in opposite directions from one another around the strength member, wherein the second group has a lay length that is greater than that of the first group.

* * * * *